(12) United States Patent
Matin et al.

(10) Patent No.: US 7,687,945 B2
(45) Date of Patent: Mar. 30, 2010

(54) METHOD AND SYSTEM FOR COOLING A MOTOR OR MOTOR ENCLOSURE

(75) Inventors: Kaiser Matin, Herndon, VA (US);
Mansour Peyghaleh, Sterling, VA (US);
Mark A. Benson, Leesburg, VA (US);
Ernest G. Penzenstadler, Herndon, VA (US)

(73) Assignee: Bluwav Systems LLC., Rochester Hills, MI (US)

( * ) Notice: Subject to any disclaimer, the term of this patent is extended or adjusted under 35 U.S.C. 154(b) by 248 days.

(21) Appl. No.: 10/949,182

(22) Filed: Sep. 25, 2004

(65) Prior Publication Data

US 2006/0066155 A1   Mar. 30, 2006

(51) Int. Cl.
*H02K 9/08* (2006.01)
*H02K 9/22* (2006.01)
*H05K 7/20* (2006.01)
*H02K 5/18* (2006.01)
*H02K 5/10* (2006.01)

(52) U.S. Cl. ............................ 310/64; 310/52; 310/88; 310/89; 361/704; 361/709

(58) Field of Classification Search ................. 361/704, 361/709, 710, 600–601; 310/64, 68 R, 88, 310/89
See application file for complete search history.

(56) References Cited

U.S. PATENT DOCUMENTS

| 1,700,840 | A |   | 2/1929  | Gay |
|---|---|---|---|---|
| 2,898,542 | A |   | 8/1959  | Wasko et al. |
| 3,340,748 | A |   | 9/1967  | Young |
| 3,538,361 | A | * | 11/1970 | Haut et al. ................. 310/68 R |
| 3,604,406 | A |   | 9/1971  | Hottelet |
| 3,681,628 | A |   | 8/1972  | Krastchew |
| 3,715,610 | A |   | 2/1973  | Brinkman |
| 3,719,881 | A |   | 3/1973  | Shibata et al. |
| 3,801,843 | A |   | 4/1974  | Corman et al. |
| 3,914,859 | A |   | 10/1975 | Pierson |
| 4,022,083 | A |   | 5/1977  | Pollak-Banda et al. |

(Continued)

FOREIGN PATENT DOCUMENTS

DE   4032606   3/1992

(Continued)

OTHER PUBLICATIONS

C. Studer, "Technical Report: Study of Cogging Torque in Permanent Magnet Machines", 1998, 3 pages, The Ohio State University, Columbus, OH.

(Continued)

*Primary Examiner*—Burton Mullins
(74) *Attorney, Agent, or Firm*—Alex Porat; Magna International Inc.

(57) ABSTRACT

A method and system of cooling an enclosure or motor is disclosed. An exemplary permanent magnet electric motor is formed with an external stator and an internal rotor. The motor controller is in thermal proximity to the motor but is thermally isolated from the motor by an air chamber. In one exemplary embodiment, one or more heat sinks are provided to create efficient heat removal paths. In another exemplary embodiment, one or more heat pipes are located in the system.

9 Claims, 17 Drawing Sheets

U.S. PATENT DOCUMENTS

| | | | |
|---|---|---|---|
| 4,106,603 A | 8/1978 | Walter | |
| 4,165,795 A | 8/1979 | Lynch et al. | |
| 4,199,037 A | 4/1980 | White | |
| 4,293,281 A | 10/1981 | Lamoreaux | |
| 4,315,171 A | 2/1982 | Schaeffer | |
| 4,322,646 A | 3/1982 | Persson | |
| 4,392,393 A | 7/1983 | Montgomery | |
| 4,424,463 A | 1/1984 | Musil | |
| 4,449,578 A | 5/1984 | Munekawa | |
| 4,458,228 A | 7/1984 | Baumgartner | |
| 4,516,044 A | 5/1985 | Bone | |
| 4,533,011 A | 8/1985 | Heidemeyer et al. | |
| 4,540,888 A | 9/1985 | Drewry et al. | |
| 4,556,247 A | 12/1985 | Mahaffey | |
| 4,574,210 A | 3/1986 | Wieland | |
| 4,595,841 A | 6/1986 | Yaguchi | |
| 4,642,496 A * | 2/1987 | Kerviel et al. | 310/68 B |
| 4,647,835 A | 3/1987 | Fujikawa et al. | |
| 4,685,867 A | 8/1987 | Patun et al. | |
| 4,754,207 A | 6/1988 | Heidelbert et al. | |
| 4,786,834 A | 11/1988 | Grant et al. | |
| 4,835,405 A | 5/1989 | Clancey et al. | |
| 4,864,176 A | 9/1989 | Miller et al. | |
| 4,941,854 A | 7/1990 | Takahashi et al. | |
| 4,961,403 A | 10/1990 | Kawaguchi et al. | |
| 4,980,588 A | 12/1990 | Ogawa | |
| 4,988,905 A * | 1/1991 | Tolmie, Jr. | 310/68 B |
| 5,006,744 A * | 4/1991 | Archer et al. | 310/89 |
| 5,015,903 A | 5/1991 | Hancock et al. | |
| 5,019,733 A | 5/1991 | Kano et al. | |
| 5,030,867 A | 7/1991 | Yamada et al. | |
| 5,073,736 A * | 12/1991 | Gschwender et al. | 310/88 |
| 5,081,365 A | 1/1992 | Field et al. | |
| 5,087,846 A * | 2/1992 | Wright | 310/87 |
| 5,111,090 A | 5/1992 | Otake et al. | |
| 5,164,623 A | 11/1992 | Shkondin | |
| 5,253,891 A | 10/1993 | Carlin et al. | |
| 5,258,697 A | 11/1993 | Ford et al. | |
| 5,264,764 A | 11/1993 | Kuang | |
| 5,347,188 A | 9/1994 | Iseman et al. | |
| 5,383,092 A * | 1/1995 | Liberati | 361/704 |
| 5,397,922 A | 3/1995 | Paul et al. | |
| 5,412,272 A * | 5/1995 | Mensching | 310/88 |
| 5,441,122 A | 8/1995 | Yoshida | |
| 5,614,809 A | 3/1997 | Kiuchi et al. | |
| 5,714,816 A * | 2/1998 | Jensen et al. | 310/89 |
| 5,747,909 A | 5/1998 | Syverson et al. | |
| 5,814,909 A * | 9/1998 | Yamada et al. | 310/64 |
| 5,854,521 A | 12/1998 | Nolle | |
| 5,898,282 A | 4/1999 | Drozdz et al. | |
| 5,899,174 A | 5/1999 | Anderson et al. | |
| 5,918,360 A | 7/1999 | Forbes et al. | |
| 5,925,947 A | 7/1999 | Kajiwara et al. | |
| 5,960,866 A | 10/1999 | Kimura et al. | |
| D416,858 S | 11/1999 | Domanski | |
| 6,018,200 A | 1/2000 | Anderson et al. | |
| 6,026,921 A | 2/2000 | Aoyama et al. | |
| 6,081,056 A * | 6/2000 | Takagi et al. | 310/89 |
| 6,087,744 A | 7/2000 | Glauning | |
| 6,094,011 A | 7/2000 | Notsu | |
| 6,100,599 A | 8/2000 | Kouchi et al. | |
| 6,114,784 A | 9/2000 | Nakano | |
| 6,160,332 A | 12/2000 | Tsuruhara | |
| 6,177,740 B1 * | 1/2001 | Burns | 310/68 R |
| 6,181,035 B1 | 1/2001 | Acquaviva | |
| 6,188,159 B1 | 2/2001 | Fan | |
| 6,198,183 B1 * | 3/2001 | Baeumel et al. | 310/52 |
| 6,212,074 B1 * | 4/2001 | Gonsalves et al. | 361/717 |
| 6,278,915 B1 | 8/2001 | Deguchi et al. | |
| 6,290,215 B1 | 9/2001 | Pinsker | |
| 6,300,702 B1 | 10/2001 | Jack et al. | |
| 6,306,056 B1 | 10/2001 | Moore | |
| 6,333,620 B1 | 12/2001 | Schmitz et al. | |
| 6,362,533 B1 | 3/2002 | Morohoshi et al. | |
| 6,374,905 B1 * | 4/2002 | Tantoush | 165/80.3 |
| 6,384,496 B1 | 5/2002 | Pyntikov et al. | |
| 6,414,399 B1 | 7/2002 | Bianchi | |
| 6,421,599 B1 | 7/2002 | Lippa et al. | |
| 6,424,891 B1 | 7/2002 | Sargent et al. | |
| 6,474,068 B1 | 11/2002 | Abdel Jalil et al. | |
| 6,492,756 B1 | 12/2002 | Maslov et al. | |
| 6,492,758 B1 | 12/2002 | Gianni et al. | |
| 6,536,207 B1 | 3/2003 | Kamen et al. | |
| 6,547,527 B2 | 4/2003 | Gaither | |
| 6,580,188 B2 | 6/2003 | Katagiri et al. | |
| 6,608,393 B2 | 8/2003 | Anderson | |
| 6,617,746 B1 | 9/2003 | Maslov et al. | |
| 6,622,804 B2 | 9/2003 | Schmitz et al. | |
| 6,639,511 B2 | 10/2003 | Haruna et al. | |
| 6,651,732 B2 | 11/2003 | Sagal | |
| 6,651,759 B1 | 11/2003 | Gruenwald et al. | |
| 6,660,967 B2 | 12/2003 | Brofft et al. | |
| 6,664,692 B1 | 12/2003 | Kristoffersen | |
| 6,677,684 B1 | 1/2004 | Kennedy | |
| 6,680,550 B2 | 1/2004 | Matsunaga et al. | |
| 6,700,253 B1 * | 3/2004 | Ohnuma et al. | 310/89 |
| 6,707,185 B2 * | 3/2004 | Akutsu et al. | 310/71 |
| 6,717,323 B1 | 4/2004 | Soghomonian et al. | |
| 6,720,688 B1 | 4/2004 | Schiller | |
| 6,722,458 B2 | 4/2004 | Hofbauer | |
| 6,731,036 B2 * | 5/2004 | Ghiotto | 310/89 |
| 6,745,117 B1 | 6/2004 | Thacher et al. | |
| 6,753,620 B2 | 6/2004 | Fukudo | |
| 6,762,525 B1 | 7/2004 | Maslov et al. | |
| 6,784,560 B2 | 8/2004 | Sugimoto et al. | |
| 6,819,016 B2 | 11/2004 | Houle et al. | |
| 6,822,353 B2 * | 11/2004 | Koga et al. | 310/64 |
| 6,849,961 B2 | 2/2005 | Takizawa et al. | |
| 6,877,581 B2 | 4/2005 | Badr et al. | |
| 6,894,625 B1 | 5/2005 | Kozma et al. | |
| 6,933,633 B2 | 8/2005 | Kaneko et al. | |
| 6,938,400 B2 | 9/2005 | Fillman et al. | |
| 6,943,467 B2 | 9/2005 | Potoradi et al. | |
| 6,966,740 B2 | 11/2005 | Mast et al. | |
| 7,005,756 B2 | 2/2006 | Westerbeke, Jr. | |
| 7,119,450 B2 | 10/2006 | Albrecht | |
| 7,224,132 B2 | 5/2007 | Cho et al. | |
| 2002/0123836 A1 | 9/2002 | Komiyama et al. | |
| 2003/0000689 A1 | 1/2003 | Kuo et al. | |
| 2004/0011918 A1 | 1/2004 | Musial et al. | |
| 2004/0124733 A1 | 7/2004 | Yamamoto et al. | |
| 2004/0155539 A1 | 8/2004 | Potoradi et al. | |
| 2005/0179262 A1 | 8/2005 | Cho et al. | |
| 2006/0157987 A1 | 7/2006 | Albrecht | |
| 2007/0050119 A1 | 3/2007 | Tamai et al. | |

FOREIGN PATENT DOCUMENTS

| | | | |
|---|---|---|---|
| DE | 19614862 | | 11/1997 |
| DE | 19636591 | | 3/1998 |
| DE | 19641254 | | 4/1998 |
| DE | 19744422 | | 4/1998 |
| DE | 19924038 | | 11/2000 |
| DE | 10063941 | | 7/2002 |
| EP | 192469 | * | 8/1986 |
| EP | 0463168 | | 2/1992 |
| EP | 0698521 | | 2/1996 |
| EP | 0790695 | | 8/1997 |
| EP | 0942517 | | 9/1999 |
| EP | 1052761 | | 11/2000 |
| EP | 1329351 | | 7/2003 |
| GB | 628763 | | 9/1949 |
| GB | 1129709 | | 10/1968 |
| GB | 1341894 | | 12/1973 |

| | | | |
|---|---|---|---|
| JP | 56162295 | | 12/1981 |
| JP | 57-49344 | * | 3/1982 |
| JP | 63183384 | | 7/1988 |
| JP | 10-234158 | * | 9/1998 |
| JP | 11-18360 | * | 1/1999 |
| JP | 11-164521 | * | 6/1999 |
| JP | 11313465 | | 11/1999 |
| JP | 2000-60060 | * | 2/2000 |
| JP | 2001-119869 | | 4/2001 |
| JP | 2002-159160 | | 5/2002 |
| WO | 97-40569 | * | 10/1997 |
| WO | WO 03/085807 | | 10/2003 |
| WO | WO 03/0105319 | | 12/2003 |
| WO | 03056687 | * | 7/2006 |

OTHER PUBLICATIONS

Zhu Z. Q., et al., "Influence of Design Parameters on Cogging Torque in Permanent Magnet Machines", Dec. 2000, 6 pages, University of Sheffield, UK.

* cited by examiner

30

30

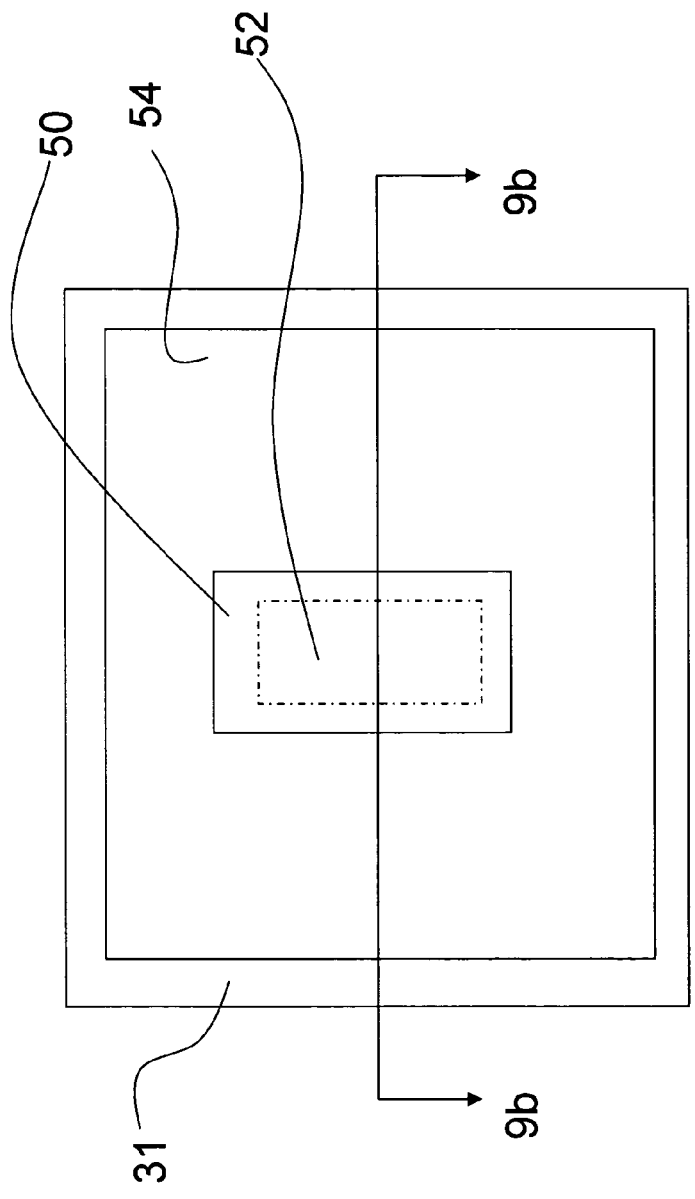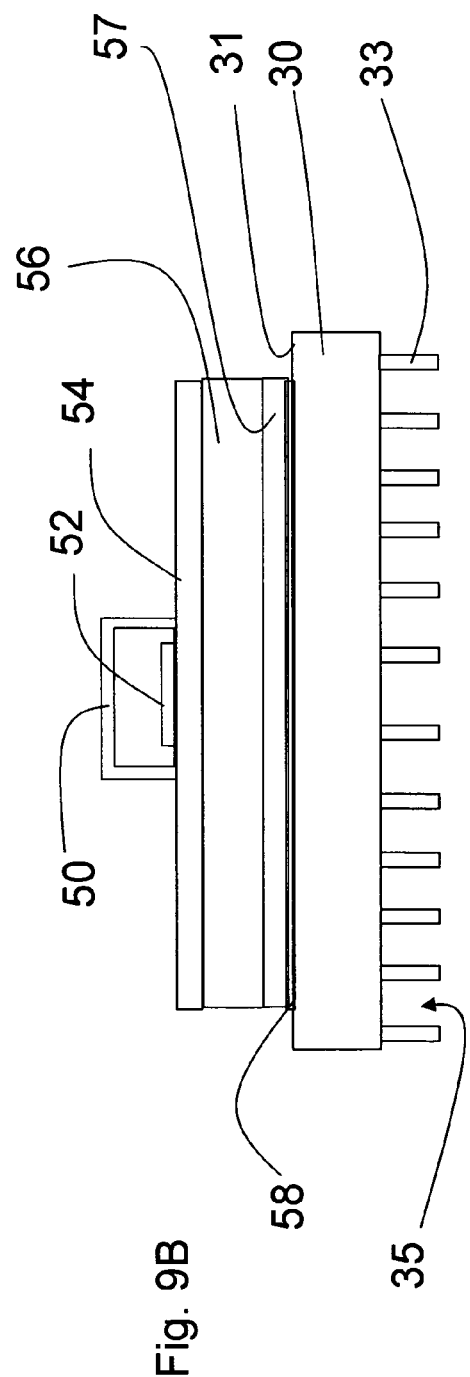

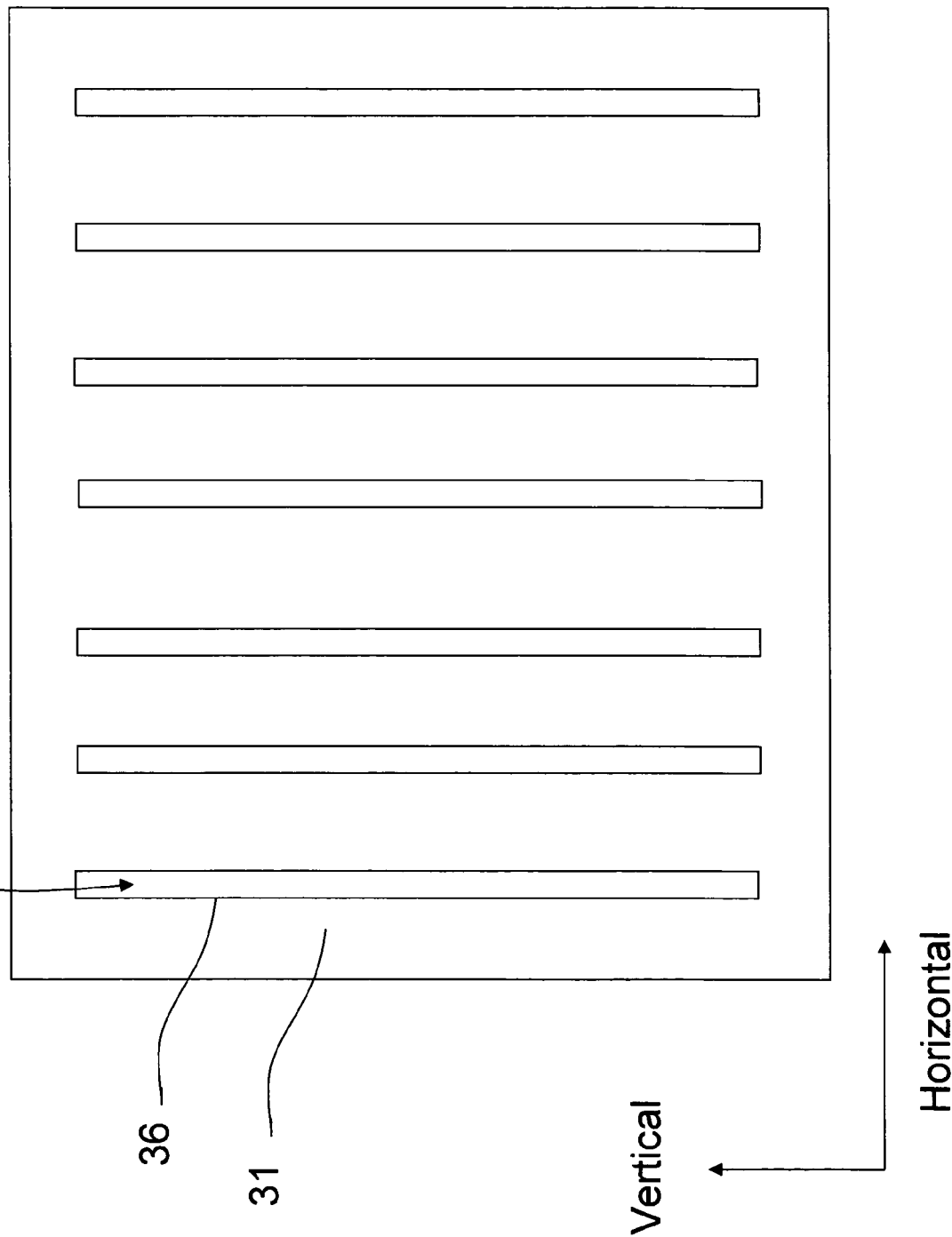

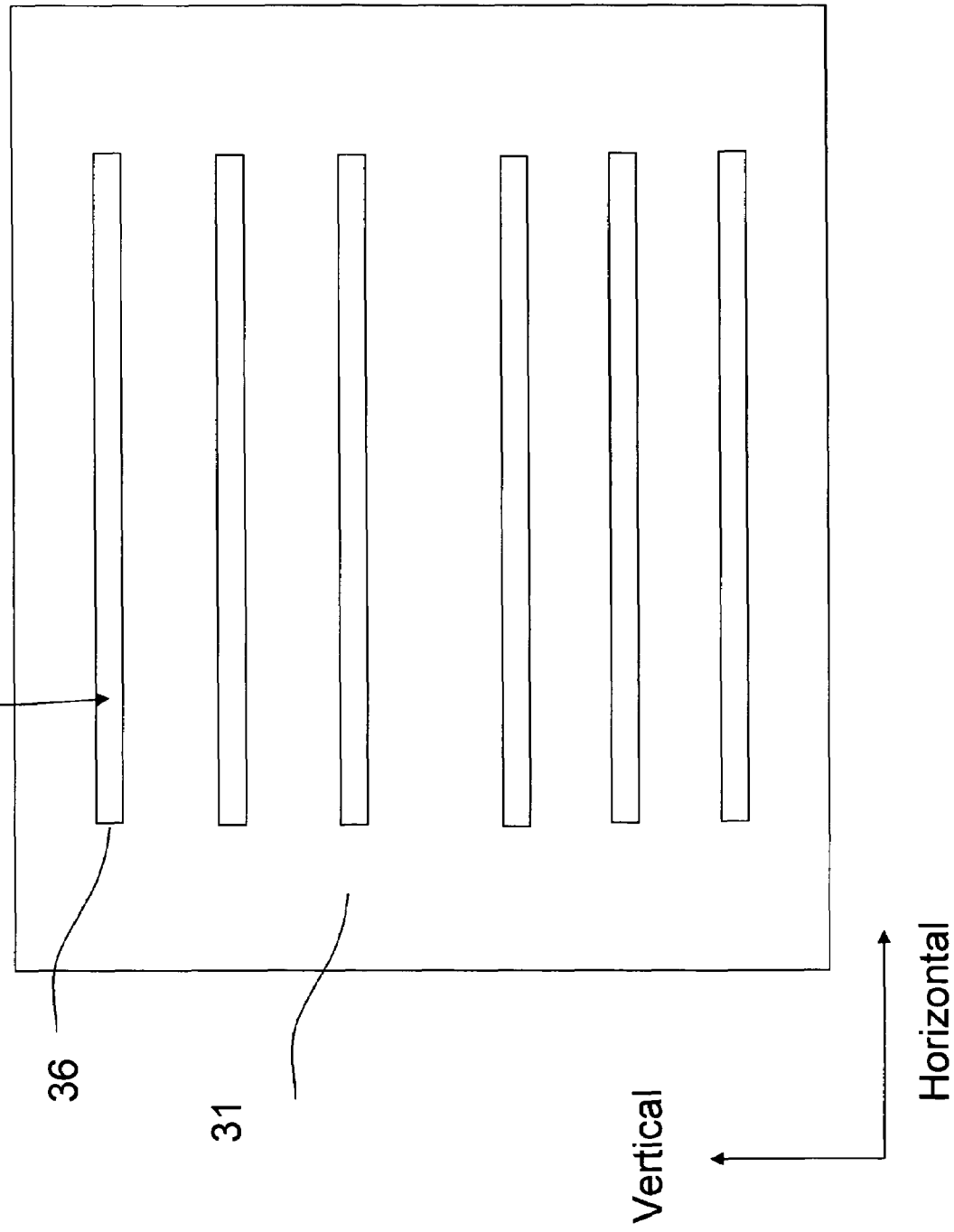

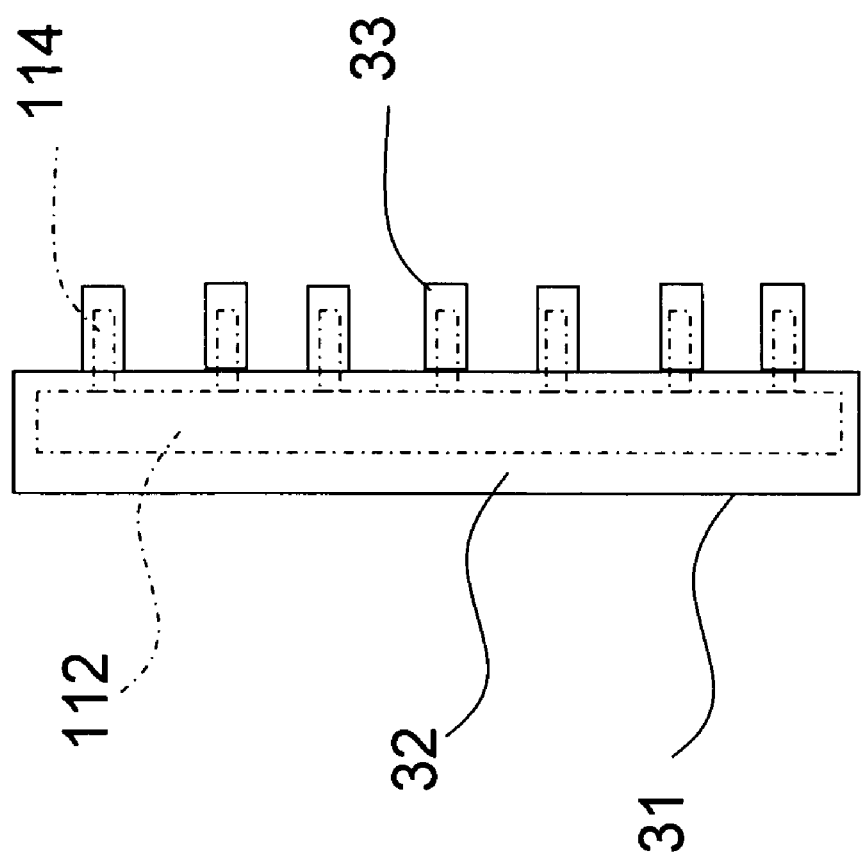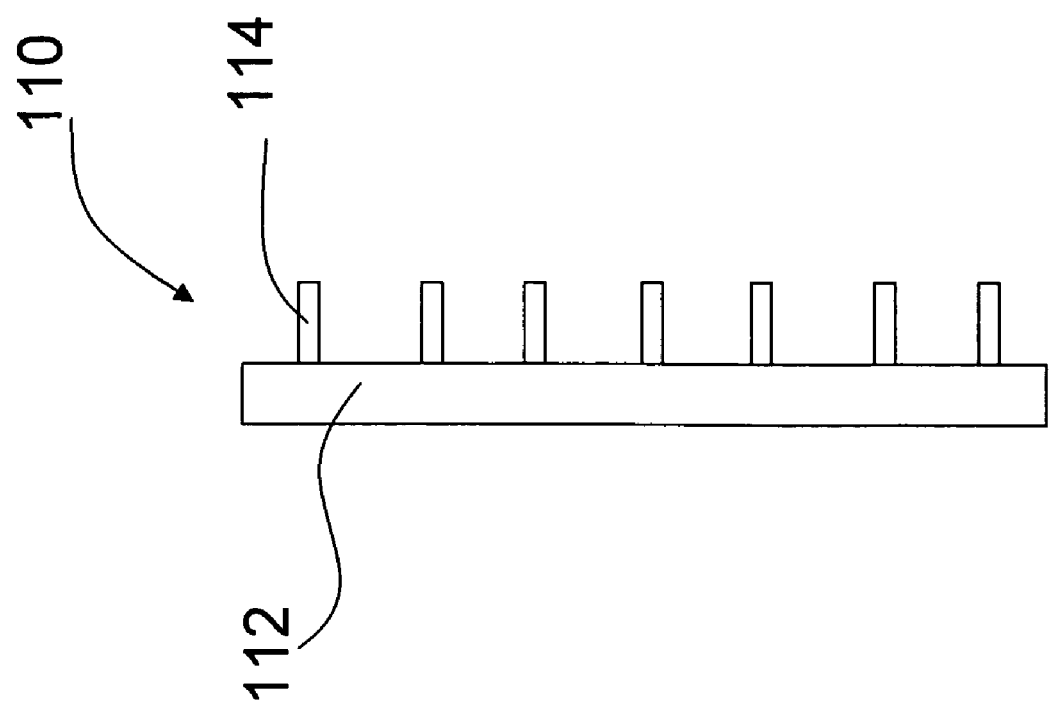

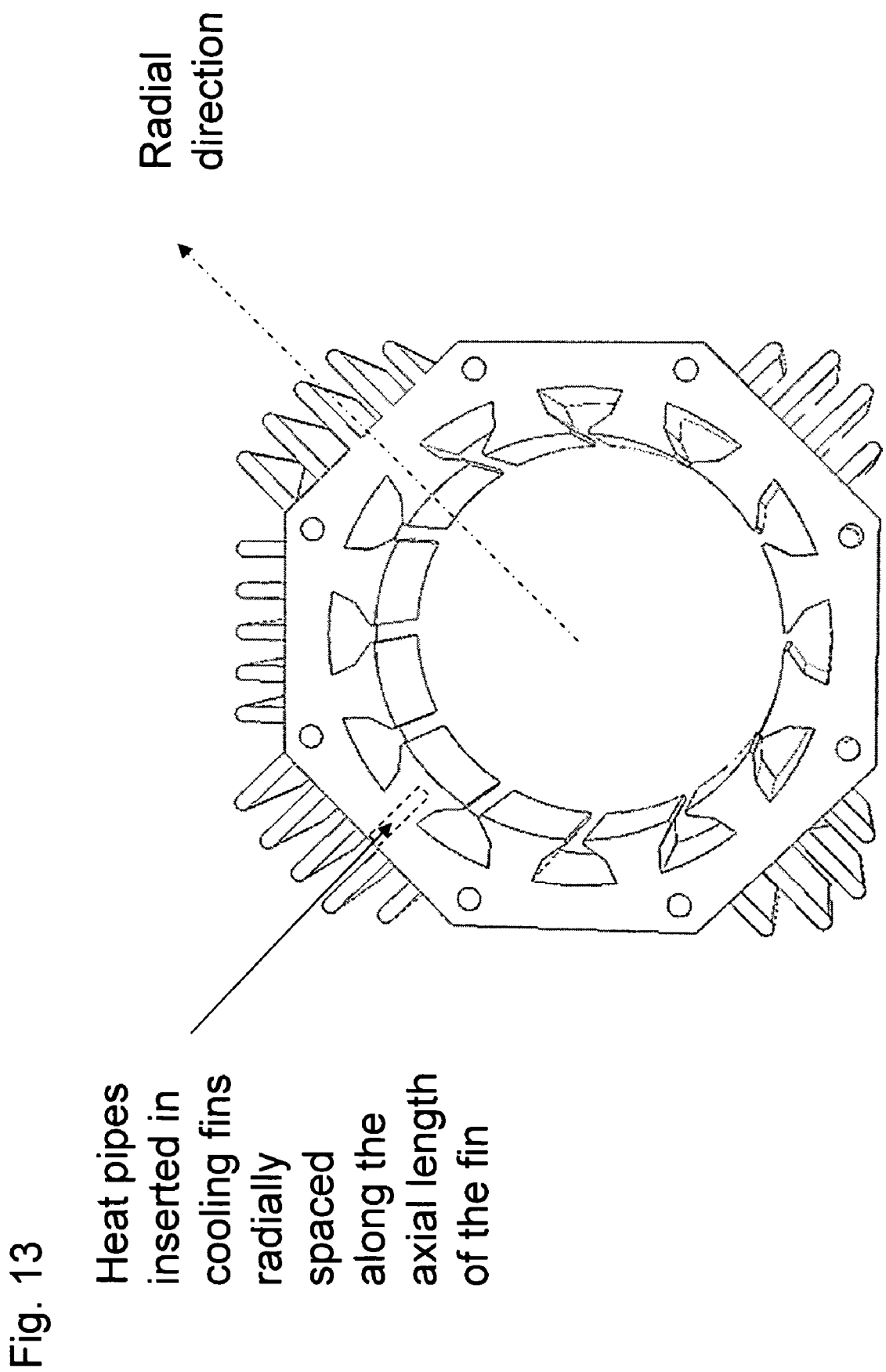
Fig. 13  Heat pipes inserted in cooling fins radially spaced along the axial length of the fin Heat pipes inserted in cooling fins axially Axial direction

METHOD AND SYSTEM FOR COOLING A MOTOR OR MOTOR ENCLOSURE

FIELD OF THE INVENTION

The present invention, described herein, relates to a method and system for cooling a motor or motor enclosure. For example, the system can be used to cool an electric motor that is placed inside a totally enclosed enclosure. The method of the present invention allows the motor enclosure to dissipate heat to outside air without using electric fans or similar means.

BACKGROUND ART

Motors generate substantial heat during operation. In general, either motor output or durability can be improved by efficiently removing heat from the motor or motor enclosure. For example, an electric motor, such as a brushless, permanent magnet motor, operates when an electric current is passed through the conductive windings which are wrapped around the motor stator. The electric current flow is resisted by the winding which results in heat being emitted from the windings and stator poles into the enclosure. In addition, heat is generated from the friction of various motor parts and connections, such as the bearings and output axle. Often motors fail because one or more motor components reaches too high of a temperature and is damaged. For example, a common failure mode for electric motors is when the motor windings get too hot and the protective insulation that surrounds the motor windings partially melts. If the winding is damaged, the electric motor will develop an electric short. This is commonly referred to as a motor "burn out" or "burn up". While the windings are designed to generate acceptable heat during normal motor operation, they can get too hot as a result of either too much current flowing through the winding (motor overload) or as a result of the air temperatures surrounding the windings getting too hot. This second condition is especially a problem when the motor is located inside a motor enclosure. However if this motor heat can be efficiently removed from the winding region of the motor than usually either the electric motor can be run at a higher speed or load if desired.

Efficiently removing heat from an electric motor is a significant technical obstacle, especially when a motor (stator and rotor) is located within a motor enclosure. Because of the concern for heat removal, electric motors are often marketed and sold based on the type of heat removal system they use. There are two main categories of motors and motor enclosures: open and totally enclosed (TE). Each enclosure name refers generally to how the electric motor is cooled. Open enclosures generally allow air to have direct contact with the motor parts through one or more openings in the enclosure. Typically, if the motors are used outside, the electric motor must be protected from water. These types of motors are commonly called open drip proof (ODP) motors. In an open drip proof motor, the motor enclosure generally has some ventilating opens at the bottom of the enclosure. The openings are arranged so that there is very limited motor contact with water, such as only a drip. These open drip motors are cooled by having cooler air from outside the enclosure continuously flow into and out of the enclosure thus removing the heat from inside the enclosure. This can be accomplished by attaching one or more blades to the shaft so that air is circulated or agitated within enclosure when the electric motor turns the shaft.

Totally enclosed (TE) motor enclosures generally prevent the free exchange of air between the inside and the outside of the motor enclosure. These motors often run at much higher temperatures than motors housed in open enclosures. Of course even though the enclosures are called totally enclosed, they are not air tight. There are several types of totally enclosed motors, each with their own motor cooling scheme. They generally include the following: totally enclosed fan cooled (TEFC), totally enclosed air over (TEAO), totally enclosed air to air (TEAA), totally enclosed pipe ventilated (TEPV), totally enclosed water air (TEAW), and totally enclosed non-ventilated (TENV).

TEFC motors are cooled by an external air fan that is generally mounted on the motor enclosure. The fan is generally away from the output shaft at the opposite end of the motor. The fan blows ambient air, air that is cooler than the air inside the motor enclosure, across the outside surface of the motor enclosure to transfer the heat from inside the enclosure to the surrounding air. TEAO motors are located in an air streams, such as in Heating, Ventilation, and Air Conditioning (HVAC) systems. The motor and enclosure are place in a location where the air moved by the HVAC system passes over the motor enclosure and cools it. TEAA motors are cooled by circulating air inside the enclosure through a heat exchanger. The heat exchanger is in turn cooled by circulating external air across the heat exchanger. These enclosures are thus called air-to-air enclosures. They typically have one or more fans for circulating ventilating air. TEPV motors typically have enclosures with openings arranged on the enclosure for inlet and outlet ducts or pipes. The inlet allows air from outside the enclosure to be brought into the enclosure. The outlet allows hot air from inside the enclosure to be expelled to the surrounding air. They typically have one or more fans for circulating ventilating air. TEWA motors are cooled by circulating air inside the enclosure. The air is first cooled through a water heat exchange. Typically the water-cooled heat exchanger cools the ventilating air and one or more fans circulate the ventilating air inside the enclosure.

TENV motors have no means for internally cooling the enclosure or the motor located inside. The motor or enclosure is cooled by radiating heat from the exterior surfaces of the enclosure to the surrounding air atmosphere. TENV motors are generally small motors, typically less than five horsepower. Thus the surface area of the motor and motor enclosure must be large enough to radiate or transfer the heat via its surface area to outside air without the aid of an external fan or air flow. A special type of TENV is an explosion proof (XP) motor or a motor housed within an explosion proof enclosure. The U.S. Bureau of Mines has applied the term "explosion proof" to motors or enclosures constructed to prevent the ignition of gas surrounding the motor by any sparks, flashes, or explosions of gas or of gas and coal dust that may occur within the motor. The term "explosion-proof casing" or "enclosure" means that the enclosure is constructed to prevent any sparks, flashes, or explosions of gas that may occur within such enclosures from igniting any gas or explosive material surrounding the enclosure. At the same time the enclosure is constructed to retain the motor parts within the enclosure during an explosion. In addition, the enclosure must also prevent ignition of gas or vapor outside the enclosure as well. Thus the motor is designed so that an explosion of flammable gas inside the motor enclosure will not ignite flammable gas outside. In addition the motor fitting, motor, switch, and or fixtures must be contained within the enclosure or in explosion proof containers so that no spark, electric arc, or heat from inside the motor will initiate an explosion in the surrounding environment.

Electric motors are generally used in mining and in explosion environments such as gas and petroleum refinement and distribution. The motors are required to be housed in explosion proof enclosures. As discussed above, these enclosures increase the amount of heat that the electric motors must withstand. Conventional electric motors and enclosures in explosion susceptible environments use one or more of the conventional heat removal techniques described above. FIGS. 1A and 1B illustrate a conventional motor cooling system 100 for an explosion proof environment. The enclosure 10 is representative of a totally enclosed enclosure as described above. The conventional system 100 is illustrated using a fan 14 to blow surrounding or external air over the exterior of the motor enclosure 10. This is commonly referred to as a totally enclosed fan cooled (TEFC) motor cooling system. The motor 20 (represented by dashed lines in FIG. 1B only) is located completely inside the enclosure 10. The fan 14 is located on one end of the enclosure 10. The motor output shaft 16 is located at the other end 11. The electrical box 12 for the motor 20 is illustrated secured to the exterior of the enclosure 10. Heat that is generated inside the enclosure 10 by the motor 20 and the various system components, such as stator windings and friction in the bearings and shaft, is dissipated by radiating the heat through the surface of the enclosure 10. The fan 14 is designed to force sufficient volumes of air over the enclosure 10 to remove the heat from inside the enclosure 10. The heat is removed by convection and radiation, in that the surrounding air is cooler than the surface of the enclosure 10. While this example has been shown with a fan 14, it is to be understood that any of the above conventional cooling systems could also be used in combination with the motor. The motor 10 also requires a controller or regulator that is illustrated as being in electrical communication with the electric box 12. They are conventionally located outside of the motor enclosure 10 since they generate substantial heat during motor operation. This is an obvious disadvantage of conventional systems. By locating the controller separate from the motor, then the system requires a separate enclosure as well as a heat removal system for the controller. Of course in explosion sensitive environment, the controller must also been located in an explosion proof container.

One skilled in the art will understand the obvious disadvantages in using fans or heat exchangers in a conventional motor or motor enclosure cooling systems. First they add to the cost and complexity of making the motor. Second, they require energy to operate the cooling system, fans etc, and labor to maintain and repair the cooling system.

However the passive conventional heat removal system described above, such as a totally enclosed non-ventilated or TENV motor also has many obvious disadvantages. First, it requires an enlarged enclosure and or motor surface area. This enlarged area is necessary to have sufficient surface area to radiate heat from within the motor or enclosure to the surrounding environment. Second, a TENV has a limited heat removal capacity or removal speed therefore motor size or operating loads must be restricted to reduce the amount of heat generated. Thus TENV cooling arrangements are not functional for motors with limited surface area that radiate heat poorly or high output motors that generate substantial amounts of heat. Third, this conventional system is generally not suitable for induction motors where the rotor as well as the stator generates substantial heat deep inside or away from the exterior surface of the motor enclosure. Four, not locating the motor controller inside the explosion proof enclosure increases cooling system cost. Conventional systems require an expensive second enclosure and heat removal system to house the controller. In addition they have the added expense of length electrical cables that must be run from the controller to the motor. The cables can result in electromagnetic compatibility (EMC) problems and can reduce the power output of the motor. Finally, if the motor or controller requires replacement, the repair technician must take the additional repair time to make sure that the controller and motor are compatible.

What is needed is an improved method and system for efficiently removing heat from a motor or motor enclosure, such as a totally enclosed motor enclosure. What is also need is an efficient heat removal method and enclosure design that would allow the controller to be located in the same explosion proof enclosure as the motor.

DISCLOSURE OF THE INVENTION

The present invention, described in detail below, at least partially fulfills the needs not met by conventional cooling methods and systems. The invention provides a method and system of heat removal for either a motor or an enclosure. In an exemplary system the controller and motor are located inside a common explosion proof enclosure. In accordance with the invention, the controller and motor are exemplary thermally isolated from each other inside the same enclosure. In addition, they are provided their own primary heat transfer path to remove heat they generate from the enclosure.

In one embodiment, the motor and controller are separated by wall with an aperture to form to an insulating air pocket or thermal isolation regions. The motor is located inside a central portion of an enclosure with stator in thermal communication with the enclosure and a permanent magnet rotor located interior to the stator. The rotor is mounted to a shaft that is journalled to the motor. The shaft rotates about a longitudinal axis when the motor operates and spins the rotor. Heat generated from operation of the motor circulates inside the central cavity. Heat is transferred by providing a plurality of cooling fins that extend in a radial direction away from the enclosure to the surrounding air. In another embodiment, a fan blade is mechanically secured to some portion of the motor to circulate air within one or more insulating air pockets. The blade aids with circulating or agitating the heat to the most efficient heat removal outlet. In another embodiment, the motor is designed and formed so that no enclosure is required. Some portion of the stator laminate structure is configured or shaped into cooling fins. In explosive environments, the laminates used to form the stators are designed to meet explosion standards. In yet another embodiment, at least one heat sink is placed in thermal communication with the controller. In another embodiment, a plurality of heat pipes are inserted in one or more places. For example, the heat pipes can be located in one or more cooling fins or any other suitable location to provide a heat path from inside the enclosure or motor to the surrounding air.

Additional advantages of the present invention will become readily apparent to those skilled in the art by reading the following detailed description of the invention. Throughout the description, only exemplary embodiments of the invention are illustrated. They are shown to illustrate the best mode contemplated by the inventor for carrying out the invention. As one skilled in the art would recognize, the invention is capable of other and different embodiments and other modifications in various obvious ways which are within the scope of the invention. The drawings and detailed description are provided as illustrations of the invention and are not intended to restrict the scope of the claimed invention, unless explicitly stated.

BRIEF DESCRIPTION OF THE DRAWINGS

The present invention is illustrated by way of example in the figures of the accompanying drawings. No limit as to the scope of the invention should be inferred by these exemplary drawings. Reference numbers and lead lines have been added to the drawings to point out certain features of the figures and to aid with understanding them.

FIG. 9A is a plan view of a controller mounted to a heat sink in accordance with the present invention.

FIG. 9B is a cross section side elevation view of FIG. 9A.

FIG. 10A is a plan view of a heat sink with cavities extending from the perimeter to at least some portion of the cooling fins.

FIG. 10B is a plan view of another exemplary embodiment in accordance with the invention.

FIG. 12A is a side elevation view of a heat pipe configuration in accordance with the invention.

FIG. 12B is a side elevation view of another exemplary embodiment in accordance with the invention.

FIG. 13 is a schematic of another exemplary embodiment in accordance with the invention.

DETAILED DESCRIPTION OF THE INVENTION

Figure 1A:
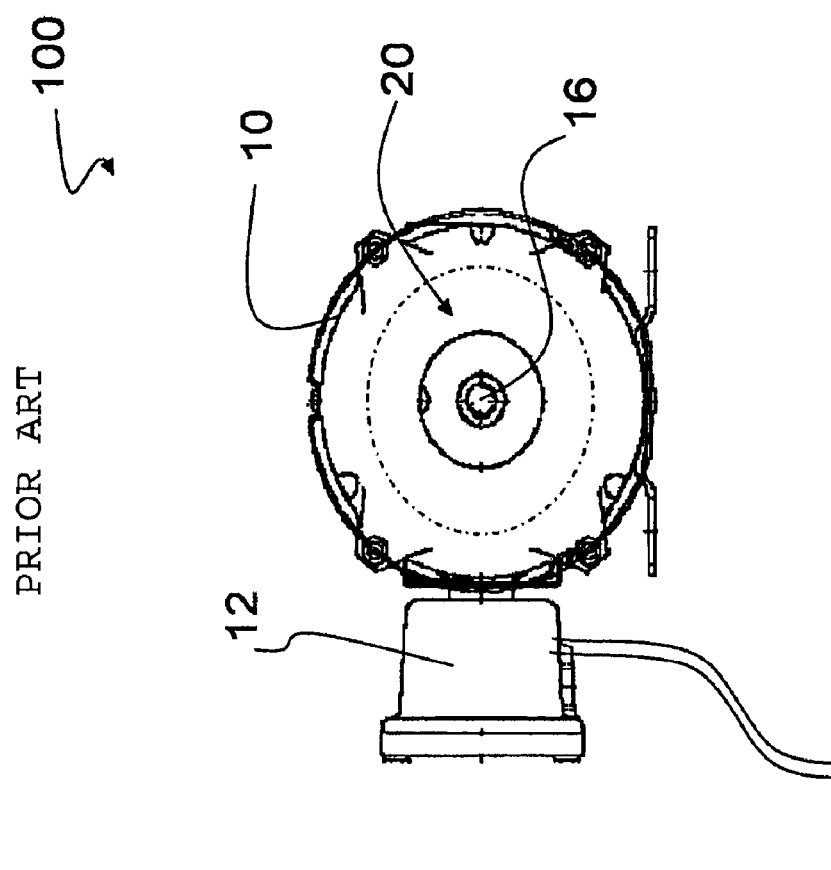
FIG. 1A is a front elevation view of a prior art cooling system.
Figure 1B:
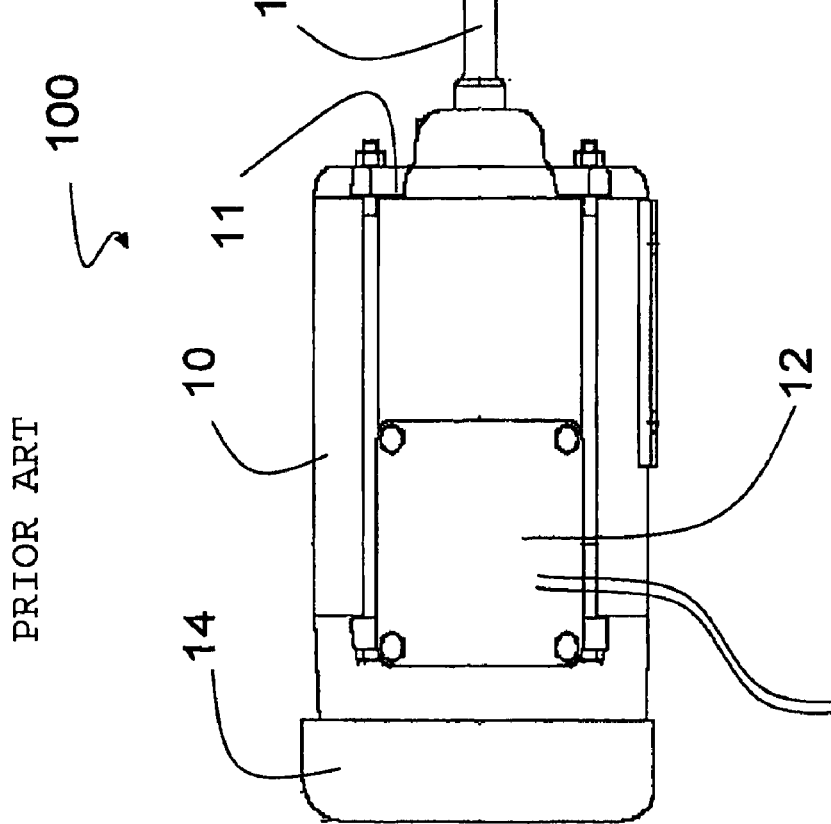
FIG. 1B is an end elevation view of FIG. 1.
Figure 2:
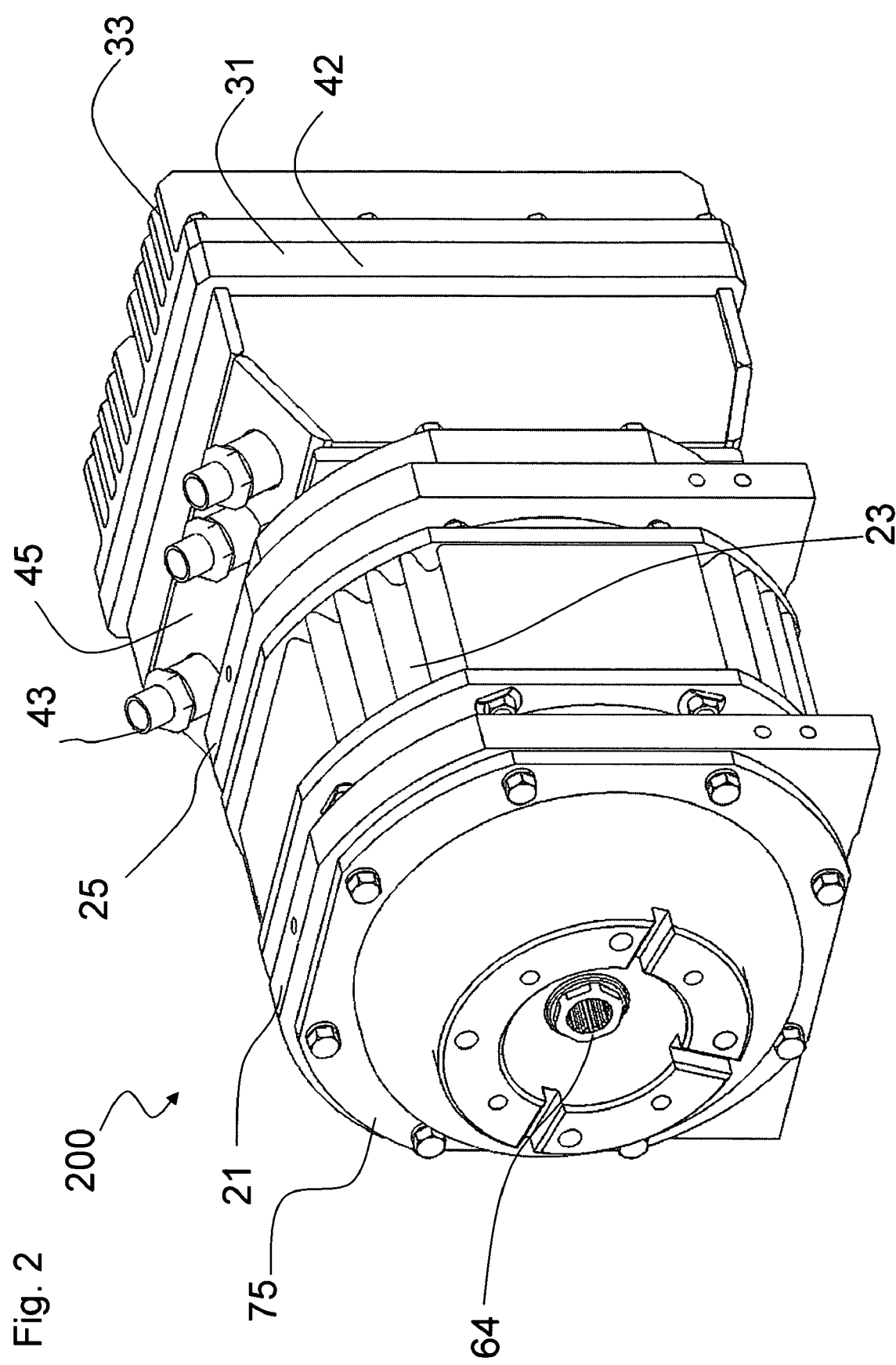
FIG. 2 is a perspective view of a motor cooling system in accordance with the present invention.

FIG. 2 is a perspective view of a motor cooling system 200 in accordance with the present invention. FIGS. 2-8 illustrate the various elements of the system 200. There are three primary regions: a motor cover 76 (FIGS. 6A and 6B), the motor 20 (FIGS. 3A-3C, 4), and the controller chamber 40 (FIGS. 7A and 7B). An exemplary heat sink 30 (FIGS. 8A-8C) is illustrated secured to the controller chamber 40 on an end of the system 200 opposite from the motor shaft 64. The shaft 64 may be formed of any suitable material such as one-piece stainless steel. The shaft is mounted to the motor by a series of bearings 85 and seals, not shown. The motor cover 76 and controller chamber 40 are exemplary illustrated as continuous structures which are mounted to the motor 20 using any conventional technique, such as bolts.

Figure 3A:
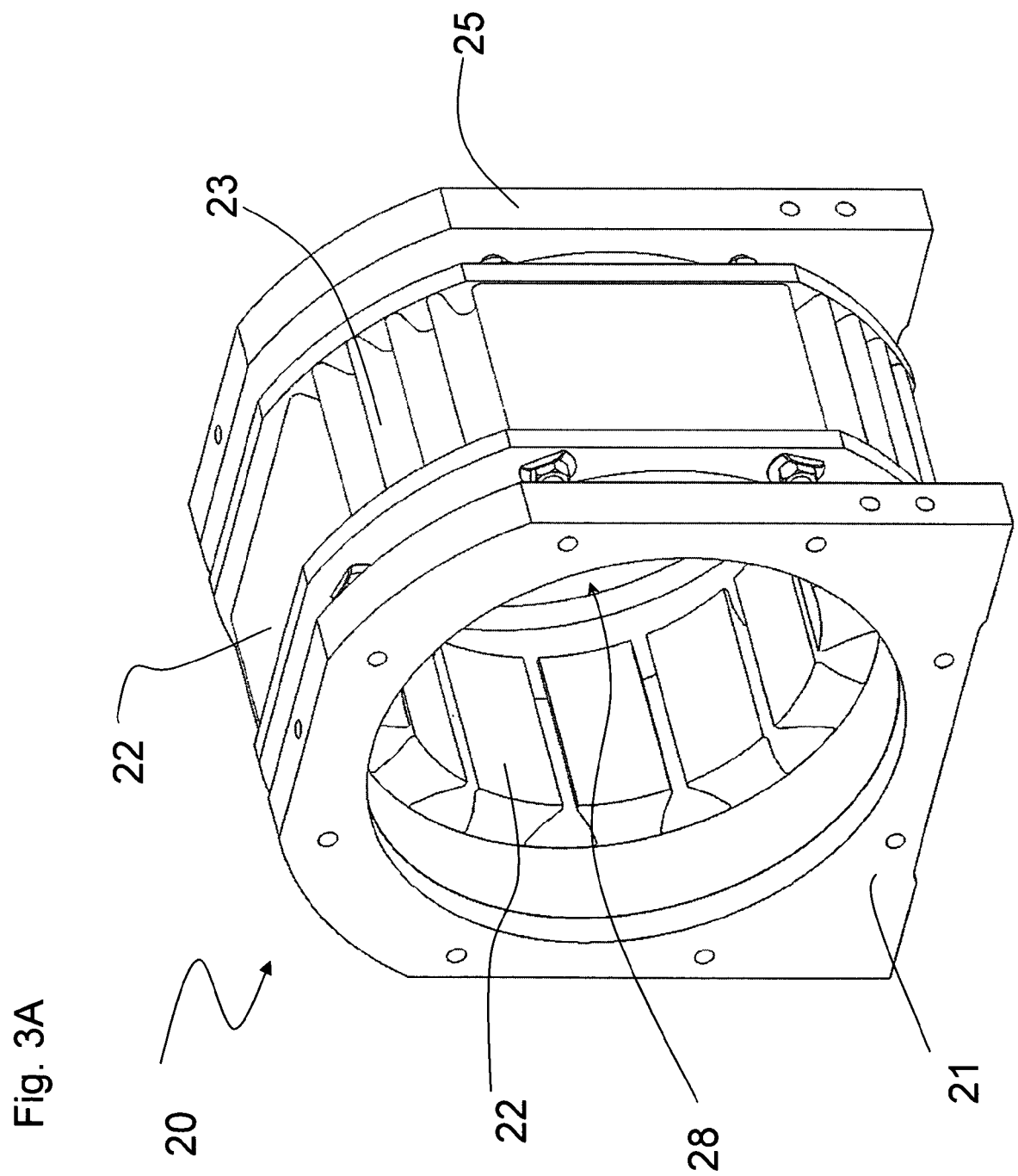
FIG. 3A is a perspective view of the motor assembly of FIG. 2.
Figure 3C:
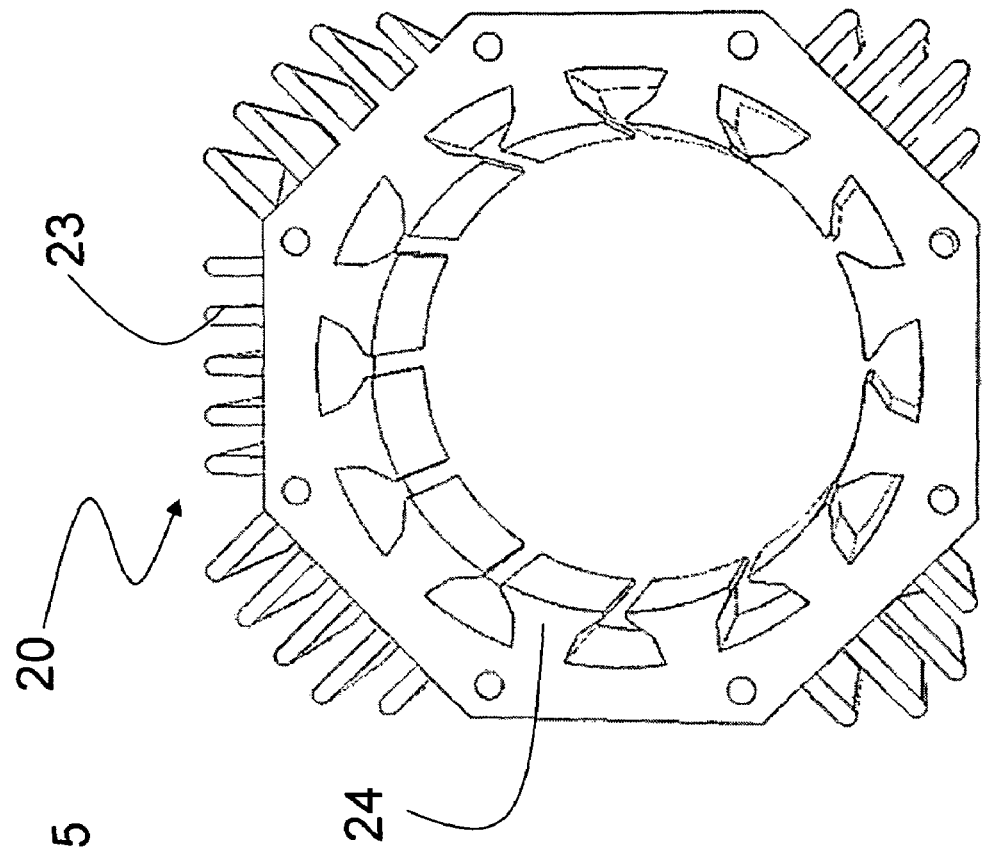
FIG. 3C is an end elevation view of the motor assembly of FIG. 2.
Figure 3B:
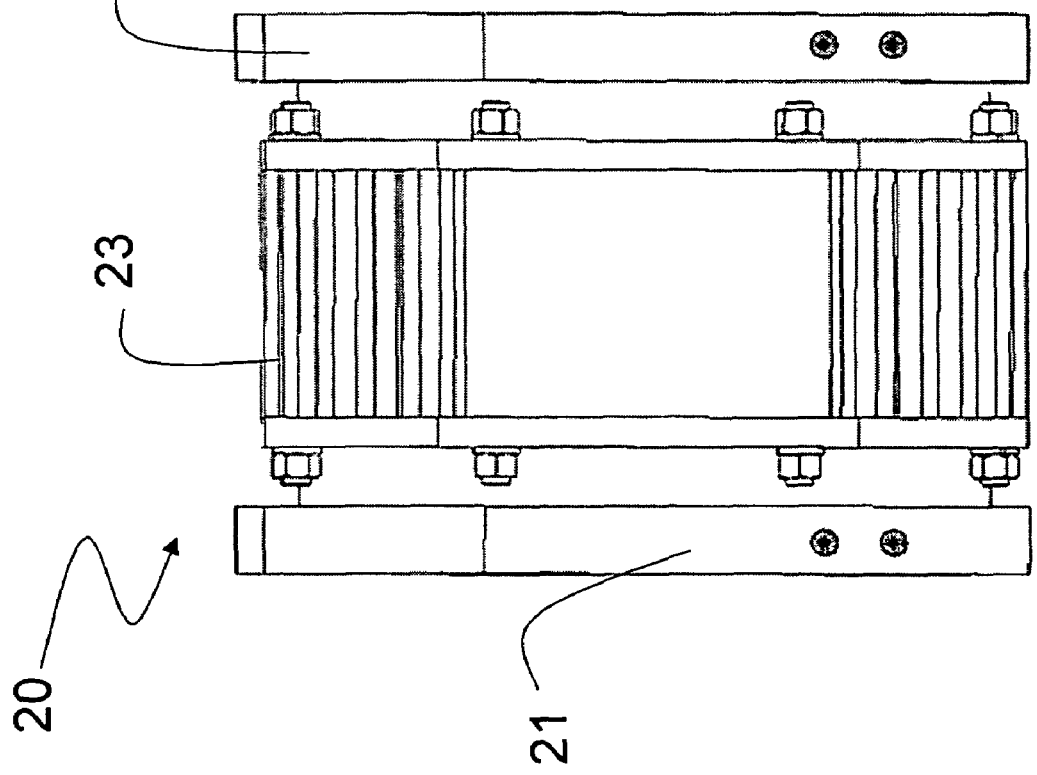
FIG. 3B is a side elevation view of the motor assembly of FIG. 2.

FIGS. 3A-3C exemplary illustrate the motor 20. It is illustrated without an enclosure. The motor 20 is exemplary fabricated using standard lamination techniques (not visible) to form the motor stator 22. To aid with heat transfer, exemplary cooling fins 23 are illustrated formed into the stator walls. The motor 20 is shown with optional end plates 21, 25 located on each end of the motor 20. It is to be understood that the above description is a basic motor description to aid with understanding the heat removal system of the present invention. FIG. 3B is a side elevation view of the motor 20. FIG. 3C is an end elevation view of the motor 20. The stator cores 24 are shown formed along the interior perimeter of the stator 22. In explosion sensitive environments, if the construction of the stator 22 conforms with explosion proof requirements than the motor enclosure (not shown) can be eliminated. Removing the motor enclosure significantly increases heat transfer from inside the motor and also reduces the cost of the motor. It is to be understood that the heat removal techniques described in accordance with the invention are also applicable when the motor 20 is located within a motor enclosure (not shown), such as a totally enclosed non ventilated enclosure.

Figure 4:
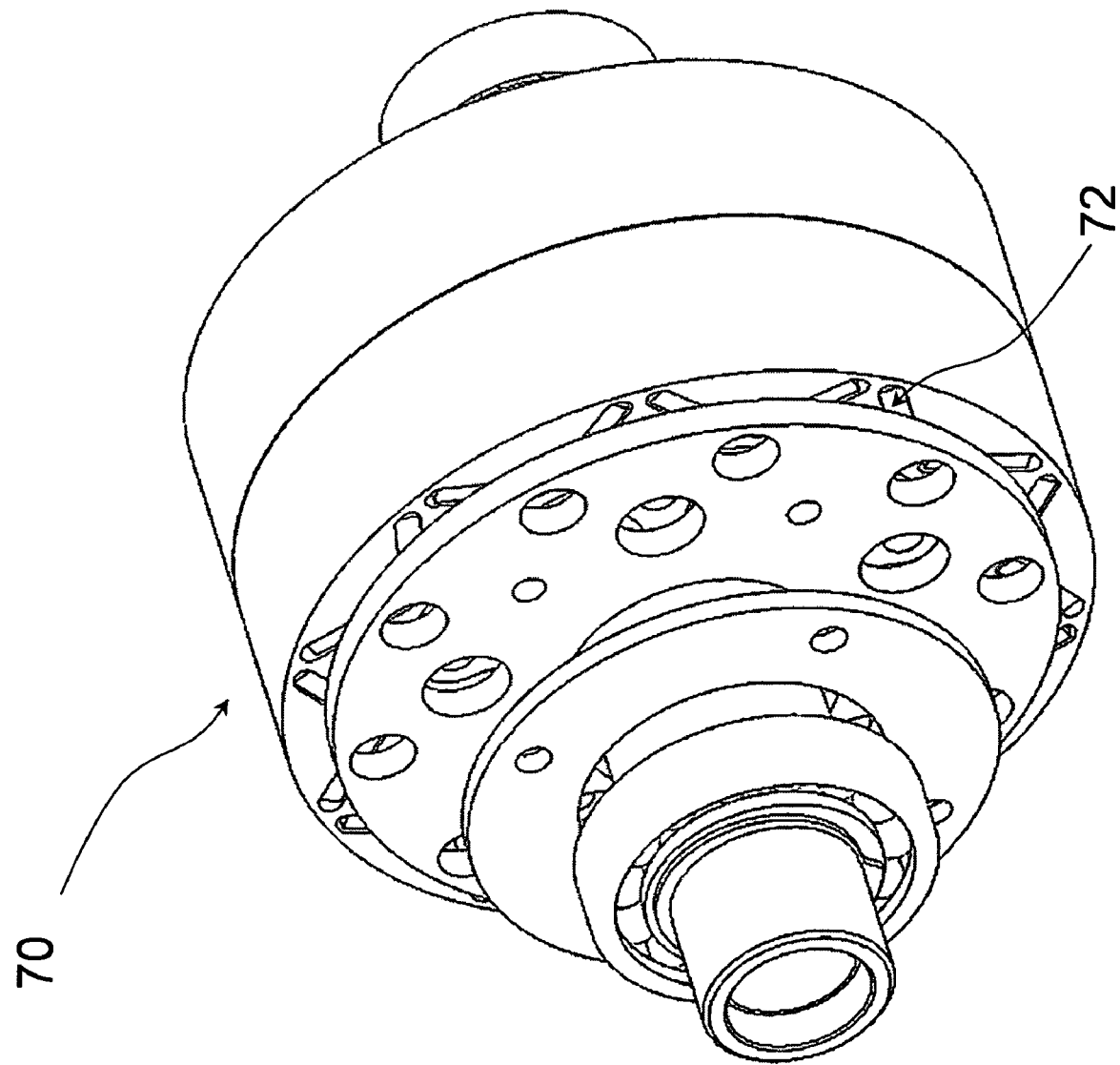
FIG. 4 is a perspective view of the rotor of the motor assembly of FIG. 2.

In FIG. 4 an exemplary permanent magnet rotor 70 is illustrated. The rotor 70 is shown with exemplary permanent magnets 72 located along the exterior perimeter of the rotor 70. The rotor 70 is inserted inside the internal perimeter or cavity 28 of the motor 20 using well known techniques. The permanent magnets which are arranged with successively alternating magnetic polarity, provide a high amplitude alternating magnetic field when rotated relative to the stator. The rotor 70 can be modified to enhance the air turbulence, such as providing holes or spaces in its back iron. Spacers may also be placed between the magnets 72 to control the pulsation of air as the rotor spins. This increases the heat transfer rate from the rotor 70 to the air contained within the motor 20. It also minimizes air drag resistance on the rotor 70. The magnets 72 may also be contoured to produce specific cogging and active torque profiles.

Figure 5:
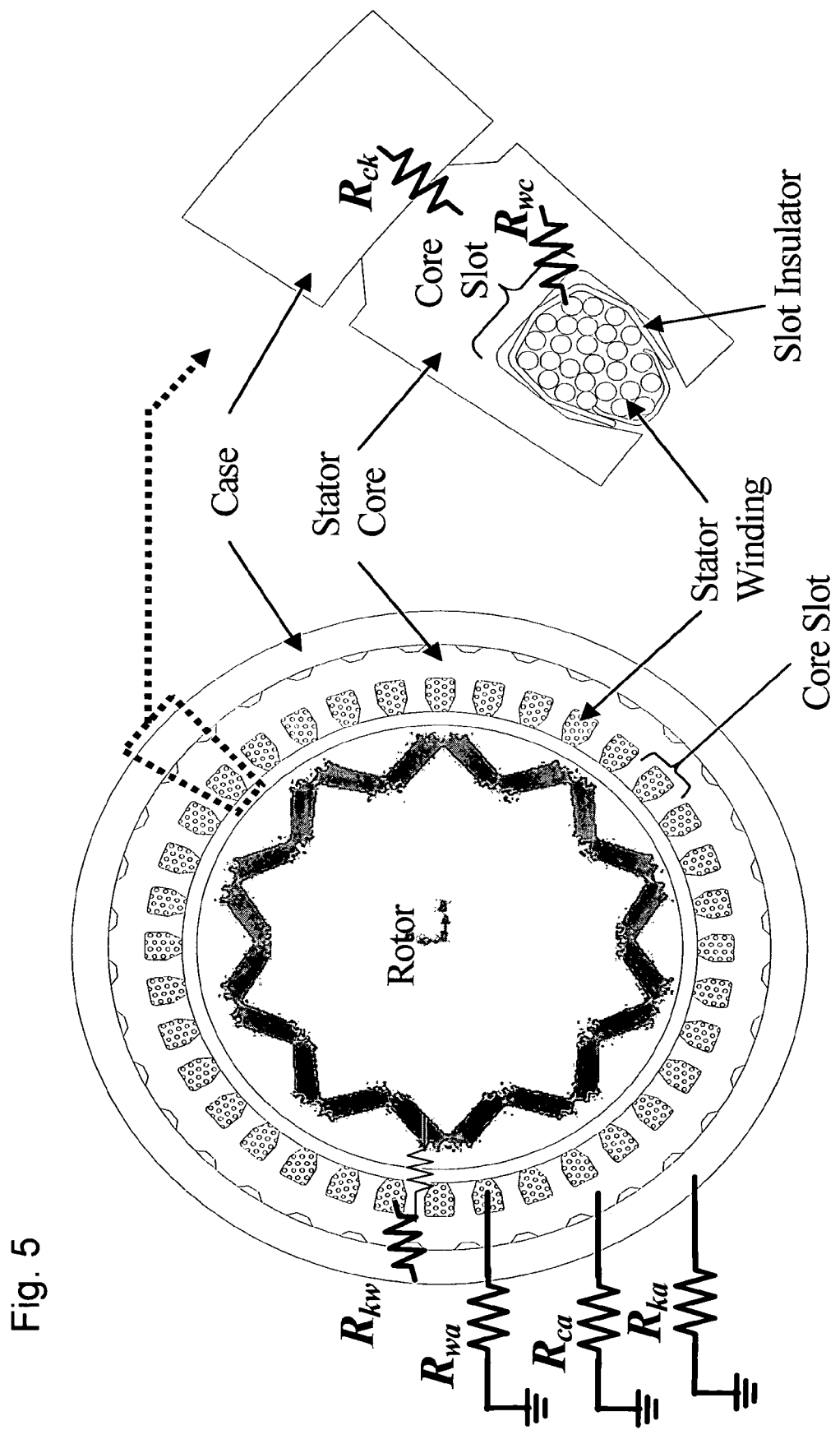
FIG. 5 is an end elevation schematic view of the motor assembly of FIG. 2.

FIG. 5 illustrates exemplary basic motor components for a permanent magnet motor. The rotor is schematically shown inside the stator ring. Each stator core has a winding wherein electricity flows in a controlled direction. When electricity is flowing through the winding a magnetic field is produced. This magnetic field alternates between attracting and repulsing the permanent magnets on the rotor. The rotor moves in one of two directions passed on the direction of current flow in the stator windings. The stator windings become hot from the current flow. The heat must be efficiently removed or else the windings will be damaged and the motor will "burn out" or "burn up."

Figure 6A:
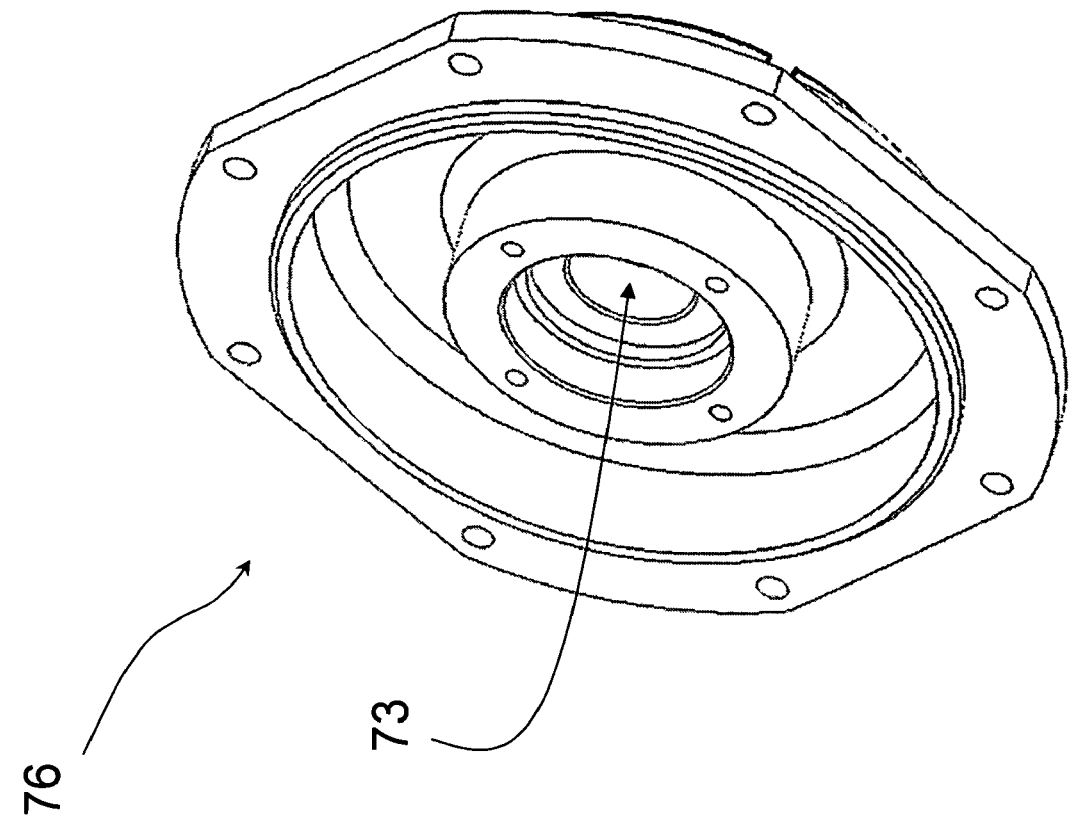
FIG. 6A is a front perspective view of the cover for the motor assembly of FIG. 2.
Figure 6B:
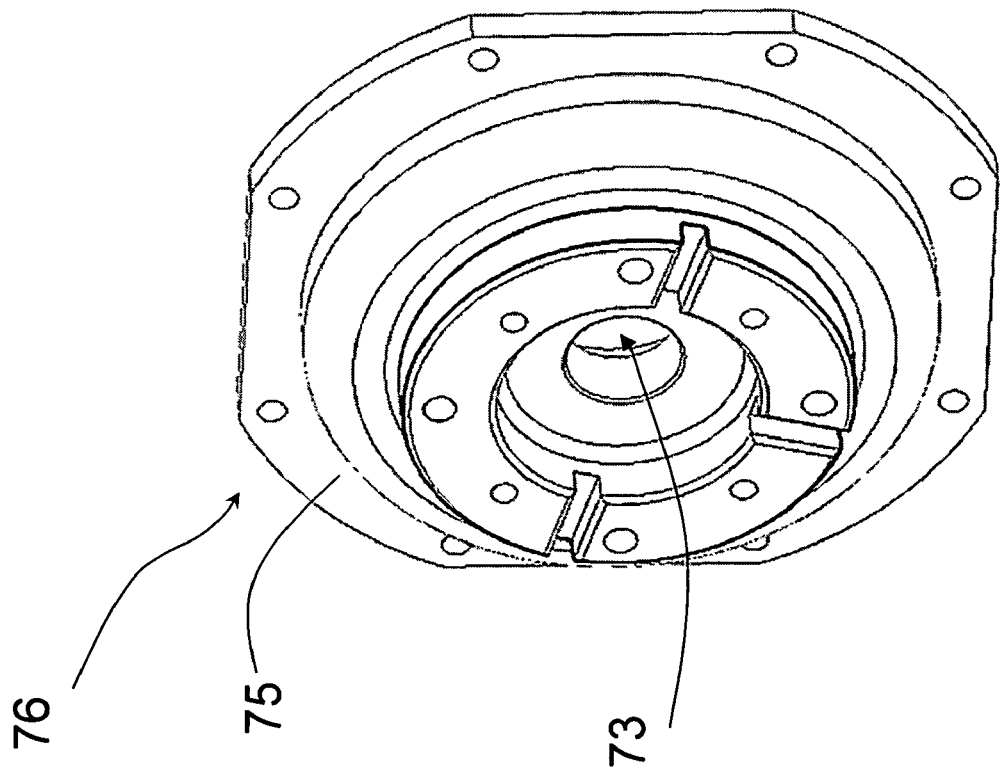
FIG. 6B is a rear perspective view of the cover for the motor assembly of FIG. 2.
Figures 7A, 7B:
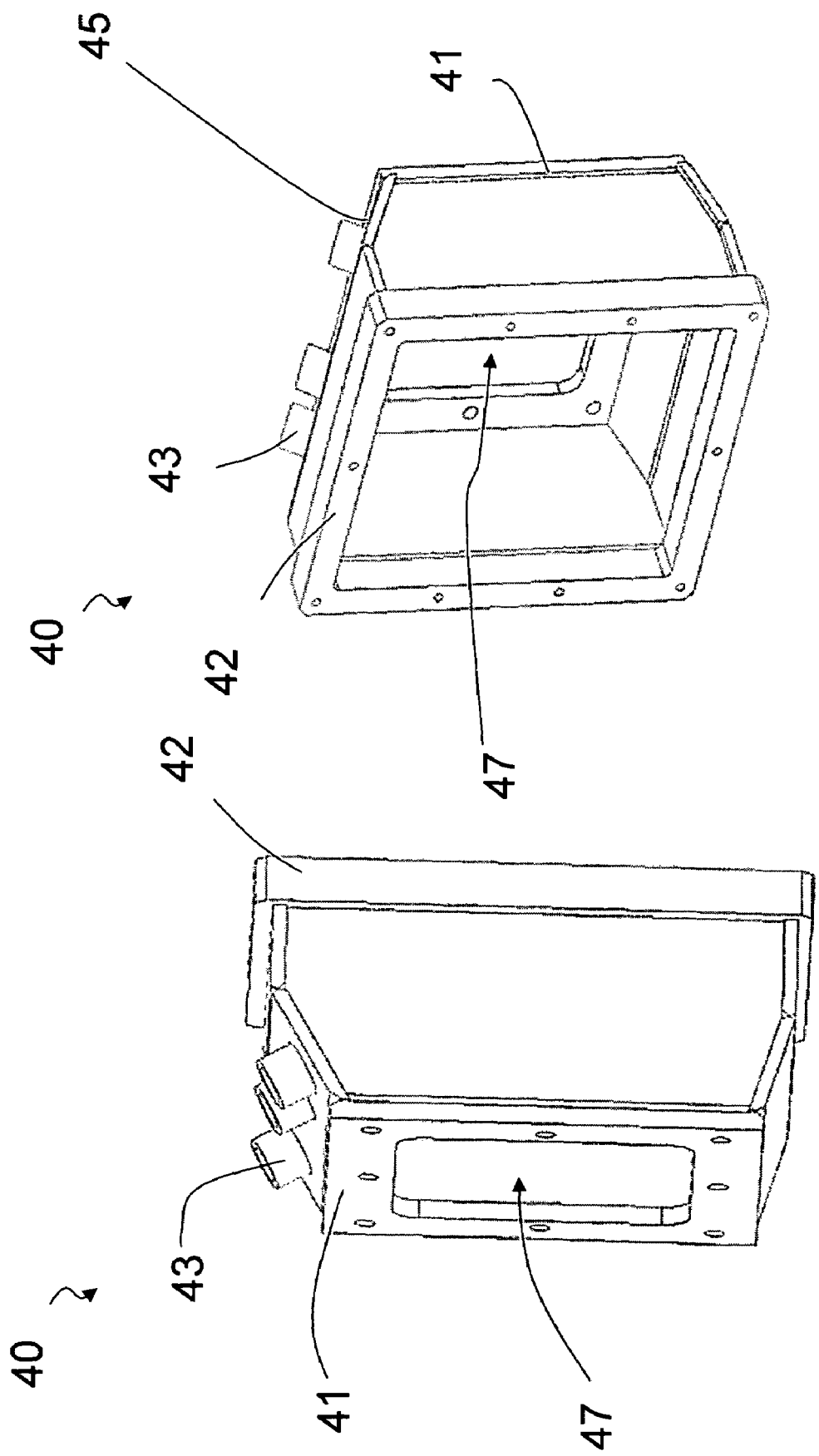
FIG. 7A is front perspective view of the cover for the motor assembly of FIG. 2.
FIG. 7B is a rear perspective view of the cover for the motor assembly of FIG. 2.

FIGS. 6A and 6B illustrate an exemplary front cover 76 for the motor 20. The cover 76 has a central aperture 73 for inserting the motor shaft 64. The cover 76 is exemplary mounted to the motor end plate 21 along the cover flange 75.

FIGS. 7A and 7B illustrate an exemplary chamber or housing 40 for the controller 52 (shown in FIG. 9A). The chamber 40 has an exemplary first flange 41 that can be secured to the motor end plate 25. The chamber has a central cavity 47 that runs its entire length. The chamber has a second exemplary flange 42 for securing the controller 52 at the opposite from where of the chamber 40 is secured to the motor 20. The chamber is also illustrated with power inlets 43 and a sloped top surface 45. The sloped surface 45 helps improve air flow around the top of the chamber 40.

Figure 8A:
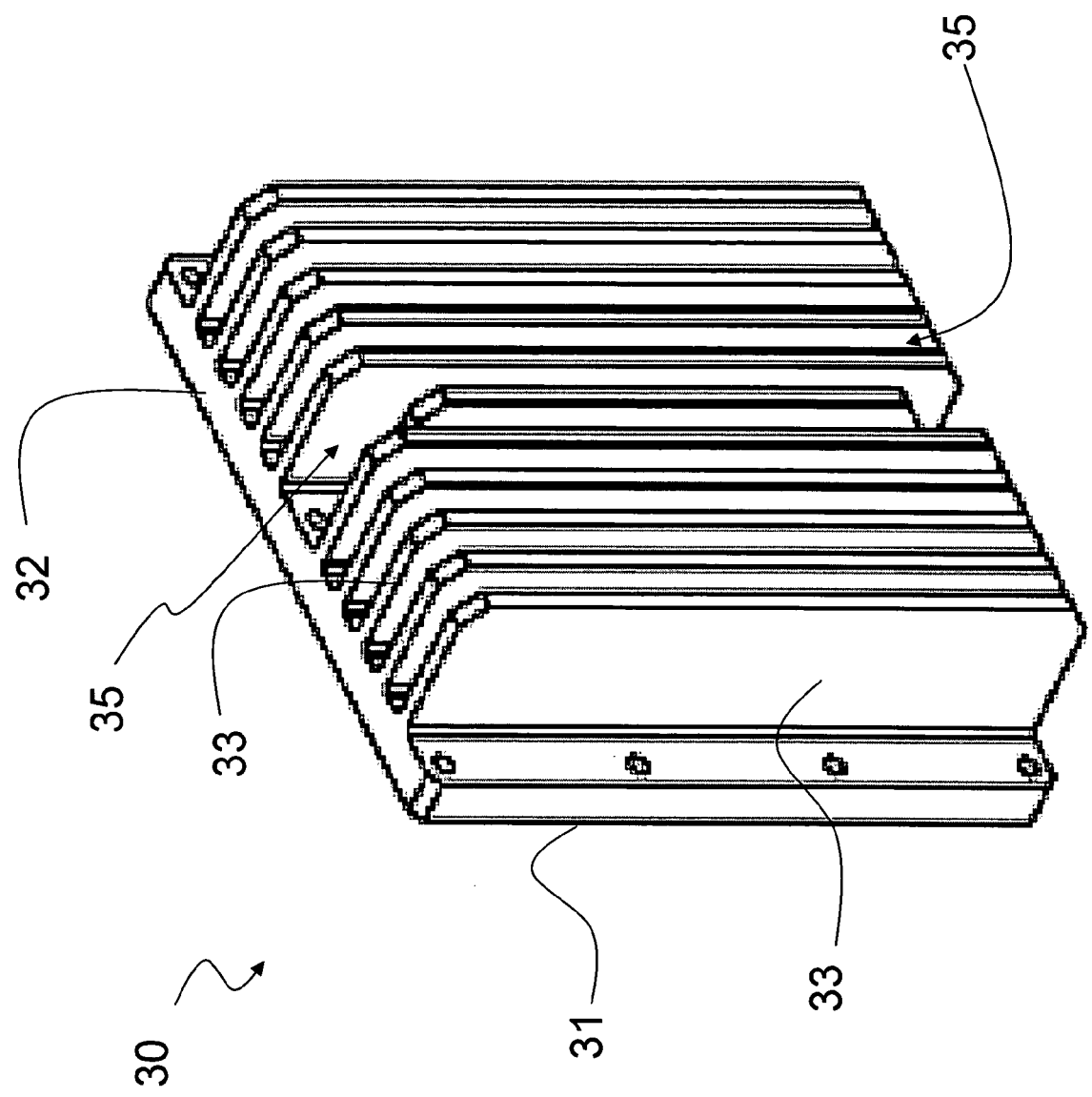
FIG. 8A is a perspective view of the heat sink of FIG. 2.
Figure 8C:
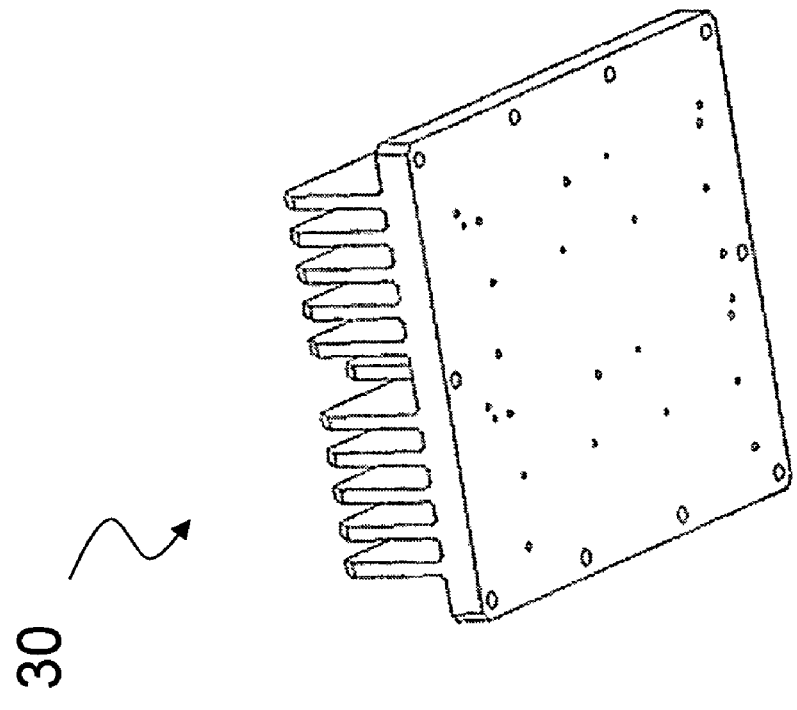
FIG. 8C is another perspective view of the heat sink of FIG. 8A.
Figure 8B:
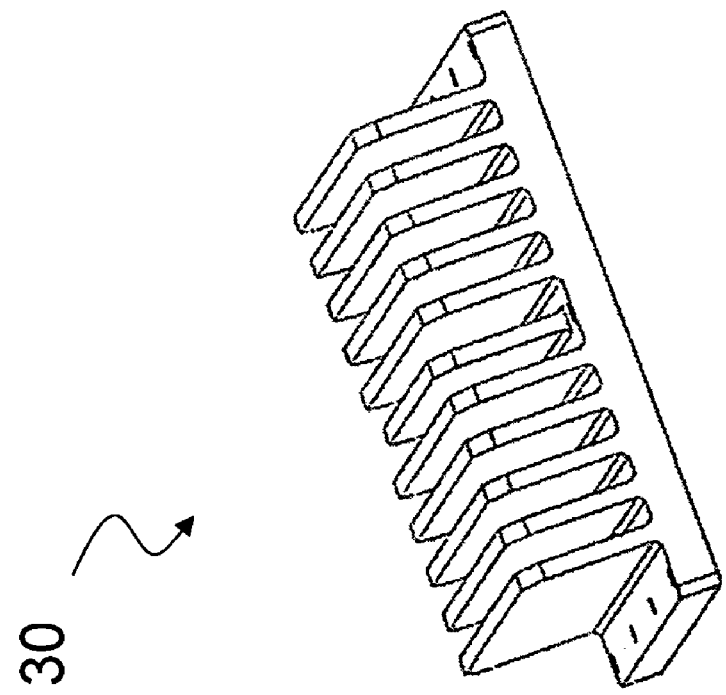
FIG. 8B is another perspective view of the heat sink of FIG. 8A.

FIGS. 8A-8C illustrate an exemplary heat sink 30 in accordance with the invention. The heat sink 30 is illustrated with a plurality of cooling fins 33. The fins 33 are mounted to the base 32 of the heat sink 30. The cooling fins 33 are separated from each other by air gaps 35. The base 32 is ideally flat and secured to the controller flange 42. In explosion sensitive environments, the heat sink base 32 and cooling fins 33 must be designed to maintain explosion proof criteria. Heat from within the controller chamber 40 is transferred from the chamber to the heat sink 30. The heat then flows throughout the heat sink base 32 and to the cooling fins 33. The cooling fins 31 provide substantial surface area due to the air gaps 35. Heat is ultimately transferred from the cooling fins 33 to the surrounding air. As the cooling fins 33 cool, additional heat can be transferred from the controller chamber 40 to the heat sink 30. FIGS. 8B and 8C illustrate additional perspective views of the heat sink 30.

FIGS. 9A and 9B exemplary illustrate the motor controller 52 secured to the heat sink 30. FIG. 9A is a plan view of the controller 52 secured to the heat sink. FIG. 9B is a side elevation cross-sectional view of FIG. 9B. The controller 52 is located internal to the chamber 40. It is ideally covered with a protective cover 50. The air in the cavity 47 of the chamber thermally isolates the controller 52 from the motor 20 even though the chamber 40 is thermally coupled to the motor 20 via the end plate 25. It is to be understood that the controller 52 can be secured to the heat sink 30 by any suitable means. FIG. 9B illustrates only one exemplary arrangement for securing the controller 52 to the heat sink 30. It is to be understood that the term "controller" as use herein is intended to broadly define one or more devices for receiving power from a battery or power source and then control and distribution the power to the motor 20. A plurality of MOSFETs (not shown) are commonly used in the controller 52 due to their non-ideal switching behavior for controlling or regulating voltage. Heat is generated in the controller 52 primarily from the operation of the MOSFETs. The majority of heat generated is a result of switching and conduction losses within the controller circuits and components.

The controller 52 is illustrated exemplary secured to a first conductive material 54, such as copper or any suitable material, also commonly referred to as a heat sink. Ideally the controller 52 will be solder or otherwise suitably secured to the first conductive material 54. In addition, a second conductive material 56, such as a ceramic material is exemplary illustrated secured to the first conductive material. Other exemplary materials include Aluminum(Al), and Aluminum Nitrate (AlN). Next a third conductive material 57, such as copper, is exemplary illustrated secured to the second conductive material. This third material 57 is exemplary illustrated as secured to the exterior 31 of the heat sink 30. There are several suitable means for making the connections, including any suitable thermal paste.

The exemplary arrangement shown in FIGS. 9 and 9B create a thermal path from the interior of the controller chamber 40 to the cooling fins 33 of the heat sink 30. The geometry of the heat sink 30 is exemplary designed for directional heat flow to the outside environment. It is commonly referred to as a "diode heat sink". The arrangement described above dissipates the heat from the control chamber 40 to the outside air by providing enhanced surface area and by selecting materials that have superior thermal conduction properties. The exemplary arrangement allows heat to flow from the controller 52 through the first, second, and third conductive materials 54, 56, 57 to the base plate 32 of the heat sink 30. The thermal resistance of the first material depends on its geometrical structure. The second layer is generally called the chip carrier layer and it provides the internal connections of the module by wire bonding. The third conductive layer ideally should help transfer the heat evenly throughout the heat sink 30. The silicon chip area and the chip thickness determine the chip thermal resistance and the area through which heat must flow to the heat sink. The dependency of the total thermal resistance on chip area is almost linear for high conductivity ceramic substrates because heat spreading is not influenced by the chip area. Thus the power loss density is excellent for high thermal conductivity ceramic substrates. Moreover isolation voltage of the controller using aluminum nitrate substrates is excellent. The majority of heat will then flow to the cooling fins 33 and be removed by air circulating around the cooling fins 33 and the air gaps 35. Efficient heat removal allows the controller 52 to work at higher power levels than would otherwise be possible.

FIGS. 10A and 10B illustrate another exemplary embodiment in accordance with the invention. The heat sink 30 previously described is illustrated with a series of partial cavities 39 with a cavity perimeter 36 The cavities 39 extend from the back 31 of the heat sink to at least some portion of the cooling fin 33. In FIG. 10A the partial cavities 39 are illustrated in a vertical direction. In FIG. 10B the partial cavities 39 are illustrated in a horizontal direction.

Figure 11:
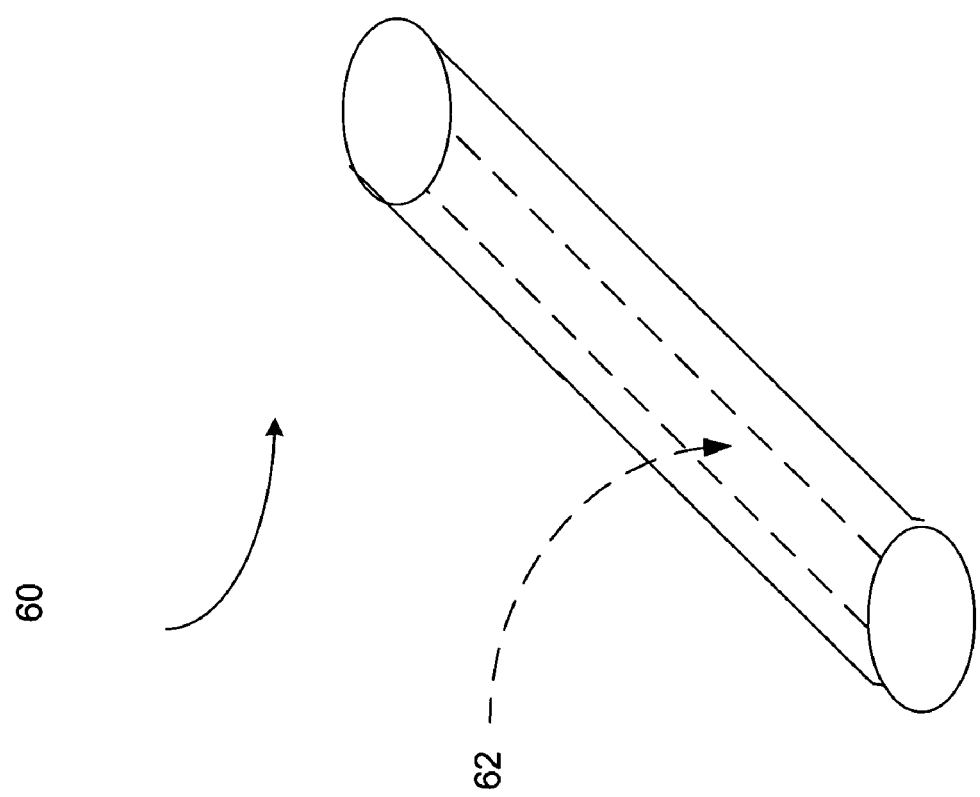
FIG. 11 is a perspective view of a heat pipe in accordance with the invention.

FIG. 11 illustrates an exemplary convention heat pipe 60 with option wick 60. Heat pipes are very efficient for removing heat in environments such as those illustrated herein. In general, heat pipes are tubular devices in which a working fluid alternately evaporates and condenses, thus transferring heat from one area to another without mechanical assistance such as a fan or pump.

FIG. 12A is a side elevation view of an exemplary heat pipe configuration 110. A central heat pipe 112 is illustrated with several extension 114 that extend outward from the central pipe 112.

FIG. 12B is a side elevation view of an exemplary heat sink 30 configuration in accordance with the invention. The heat pipe configuration 110 of FIG. 12A is inserted into one of more of the apertures 39 that were illustrated in FIGS. 10A and 10B. In additional embodiments the central heat pipe can also be directly thermally coupled to one or more of the conductive layer 58 illustrated in FIG. 9B. The addition of the heat pipe configuration 110 of FIG. 12A greatly increases the rate of heat transfer from the controller chamber 40. It is to be understood that the location and number of heat pipe arrangements can be optimized for a given motor or enclosure design. For example, the depth the heat pipe penetrates into the cooling fin 33 can impact the heat transfer rate. The heat pipes can be inserted into the cavity using techniques well known in the art.

FIG. 13 schematically illustrates another exemplary embodiment of the invention. This figure illustrates one or more heat pipes 60 inserted into the stator region from a radial direction. The heat pipes aid with heat transfer from the stator to the outside air. It is to be understood that he location and number of heat pipes could be optimized for a given motor design or configuration. In addition, the heat pipes could optionally be inserted inside the stator cooling fins in a radial direction. It is to further be understood that the heat pipes could be inserted in a radial direction at optimal locations in the axial direction.

Figure 14:
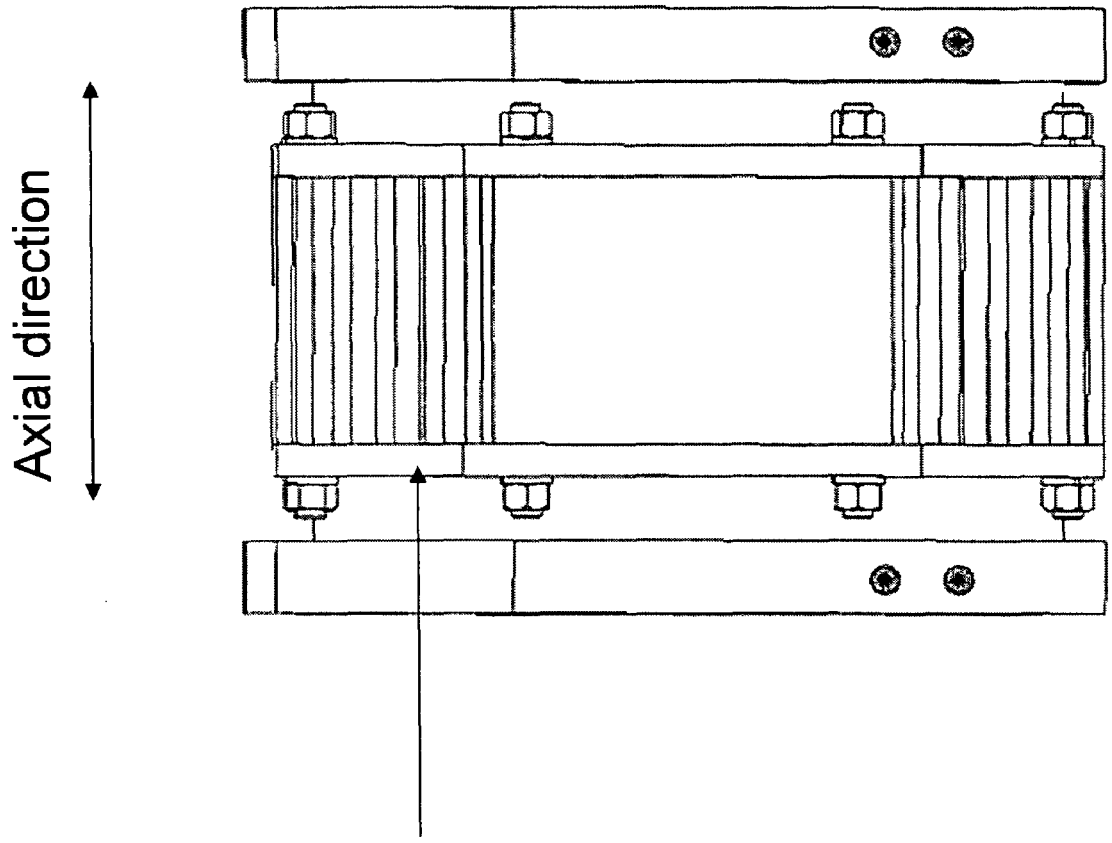
FIG. 14 is a schematic of another exemplary embodiment in accordance with the invention.

FIG. 14 schematically illustrates another exemplary embodiment of the invention. This figure illustrates one or more heat pipes 60 inserted into the stator region from a axial direction. The heat pipes aid with heat transfer from the stator to the outside air. It is to be understood that he location and number of heat pipes could be optimized for a given motor design or configuration. In addition, the heat pipes could optionally be inserted inside the stator cooling fins in an axial direction. It is to further be understood that the heat pipes could be inserted in a axial direction at optimal locations in the radial direction. It is to further be understood that the invention likewise applies to a combination of the two heat pipe schemes illustrated in FIGS. 13 and 14.

As discussed above, in accordance with one embodiment of the invention the controller 52 is thermally insulated from the motor 20 by air located in the controller chamber 40. As a result the thermal junction temperature of the controller can generally be maintained within defined limits. Using Finite Element Analysis (FEA) models confirmed the benefit of thermal heat flux through the exemplary layers illustrated in FIG. 9B. Moreover a three dimensional FEA model further validate the efficient thermal management that results from the exemplary configuration illustrated above. Thus the air located in the controller chamber 40 effectively thermally insulates the controller 52 from the motor 20. As a result no separate cooling system is required for the controller. Of course the rate of heat transfer depends on the heat spread angles of the various components of the controller.

In order to guarantee optimal motor utilizations capability, heat generated from power losses in the controller 52 have to be transferred efficiently through the connection and isolation layers to the heat sink 30. In most cases, the maximum junction temperature, Tj is 150 degrees Celsius for silicon components. The thermal behavior of the controller 52 can be modeled by a one dimensional thermal network model and a three dimensional FEA model. Both models generally predict temperature at the junction within 1% of each other. The benefit of the three dimensional FEA model is that it predicts thermal junction temperature in case of multiple gate or transistor thermal couplings in the controller 52. The FEA model also provides data on the thermal spread of the heat flux through individual controller components 52 and thus helps in characterizing the parameters for the various heat sinks. By defining the spread angles for different material layers material thickness can be optimized for each components to further improved heat transfer. Thus a three dimensional FEA model provides the necessary predictive thermal management to design a motor wherein the controller is in thermal proximity to the motor but thermally insulated from the motor by air.

The analysis below describes the thermal behavior of the controller 52 with and without a heat sink. The junction temperature ratings of typical MOSFET power devices used in the controller 52 are typically only about 150° C. However in many environment, such as mining the temperature of one or more components could exceed 160° C. or higher. Without efficient heat removal this could adversely interfere with the operation of the controller 52. To analyze the utility of the invention a thermal model for the motor was developed. The model was used to predict the temperature profile of and heat flow of the motor 20 and controller 52.

The thermal analysis demonstrated that there is sufficient heat removal when the controller 52 is located in the same enclosure as the motor and uses the cooling system as described in the present invention. In the analysis that follows the following assumptions were made. The peak motor operating conditions were:

46 HP at 2300 Revolutions per minute (RPM) with a full field current 374 Amperes.

The following heat sources were analyzed: conduction loss from the stator windings, Pw; iron loss from the stator core, Pc; conduction loss of the controller or MOSFETS, Pd; conduction loss of the permanent magnets (negligible when compared with the controller and stator losses).

From 0 to 1650 rpms, the temperatures of the motor rose as the conduction loss, increased. For motor speeds higher than 1650 rpms, the power loss inside the motor was the same. however, the air flow inside the motor increase to where the heating effect due to the power loss was negligible. Thus at speeds greater than 1650 rpm the motor temperature stabilizes by conduction heat transfer through the motor walls to the outside air.

The heat energy transfer paths between different parts of the system are controlled by the thermal resistances of the various material. When the motor is running, natural convection occurs due to the ambient air flow around the motor and controller. This natural convection removes substantial amounts of heat from the motor. The air flow over the controller 52 aids in efficient heat transfer path from the controller. The results of the system according to the invention were validated by finite element model (FEA). The following motor thermal resistances partially illustrated in FIG. 5 were used in calculating the rate of heat transfer:

Rdk: controller to heat sink
Rda: controller to outside air
Rwk: stator-winding to stator core
Rwa: stator-winding to outside air
Rka: case-to outside air The heat flow from the controller (MOSFETs) to the outside air was modeled by a dependent temperature source TD (=Td) in series to a thermal resistance Rdw and connecting to the node Tw. This modeling method described how the controller (MOSFET) temperature or heat was isolated from the motor winding temperature or heat. The heat flow from the motor to the controller plate was only about 1% of the total power loss from the stator winding. This validate that the controller 52 can be effectively thermal insulated from the motor by air using one or more of the exemplary configurations provided herein. It also demonstrates that strategic manipulation of variables like Rdk and Rda can improve thermal isolation between the controller 52 and the motor 20 by designing appropriate heat sinks. This is extremely important because the heat generated by the controller 52 leaves by conductive heat transfer through different connections and isolation layers. Thus the capability of dissipating this heat depends on the internal characteristic of the controller, its various heat paths, and the external ambient thermal conditions. The speed and amount of heat that can be efficiently dissipated or transferred ultimately determines the operational current, switching frequency and voltage of the controller.

The quality of the thermal heat flow path can be quantified by the total thermal resistance from the controller 52 to the external air. Ideally the controller is directly secured to a conductive material or heat sink 54. Some factors that influence heat generation or dissipation include: switching frequency, controller surface thickness, geometry and position, material and structure of the controller substrate (not shown), thermal qualities of the solder and thermal paste used to secure the controller, and surface area and geometry of the heat sinks used.

Testing has shown that almost 60% of the thermal resistance comes from the controller substrate; which acts like an internal insulation. For high voltage controllers thicker substrates, such as isolation ceramics like Aluminum nitrate are used. The advantage of directly pressing the controller to the heat sink with a thermal paste, such as AP-12, is that it reduces the module thermal resistances of the controller components. As result the controller 52 will be closer to the heat sinks than if a base plate is used. The connections are more even with a thin layer of paste as no pressure mounting is required which can induce uneven bending. Moreover the absence of a copper base plate also diminishes thermal expansion problem and provides intimate thermal contact between controller substrate and the heat sink.

The calculation of the junction temperature can be easily be calculated by a one-dimensional thermal network model. In this calculation the following abbreviations are used in determining the thermal budget.

$P_T$=Power dissipation, watts
$T_j$=Junction temperature, °C.
$T_h$=Heat sink temperature, °C.
$T_c$=Case temperature, °C.
$T_a$=Ambient temperature, °C.
$Z_{jc}$=Thermal impedance or transient thermal resistance from module to case, °C./W
$Z_{ha}$=Thermal impedance from heat sink to ambient, °C./W
$R_{jc}$=Thermal resistance from module to case, °C./W
$R_{ha}$=Thermal resistance from heat sink to ambient, °C./W The junction temperature due to a single short pulse can be calculated using the following formulation; where the terms inside the summation sign represents the total thermal impedance $$\Delta T_{j\,max} = P \cdot \Sigma R_{thv}(1-\exp(-t/\tau_{thv})) \quad (1)$$

The junction temperature due to a multiple short pulses can be calculated using the following formulation;

$$\Delta T_{jmax}(t_m) = \sum_{\mu=1}^{m}(P_\mu - P_{\mu-1})\sum_{\nu=1}^{n}R_{thv}(1-\exp(-(t_m-t_{\mu-1})/\tau_{thv})) \quad (2)$$

Generally, 70% of the thermal budget is allocated to the case to ambient thermal temperatures rise; the remaining 30% is allocated to different components from the junction to the perimeter. Almost 60% of this internal thermal resistance is due to the second substrates layer, ideally (Alumina or Aluminum nitrate), and the remaining 40% is for the solders, silicon, various conductive layers and thermal pastes or adhesives. For one dimensional steady state heat transfer due to thermal conduction, the temperature rise due to the power dissipation depends on the total thermal resistance of all the layers and can be derived from Equation 1 above. Omni-directional heat flow from the heat sink to the ambient is exemplary provided by using vertical fins as illustrated above that carry at least 500 W/m2 of surface heat flux. This translates to an ambient approximately a thermal resistance of 0.1 degree C./W. The thermal resistance of any contact interface depends inversely on the area of the contact. Therefore more contact will decrease the thermal contact resistance. Thermal resistance of the thermal paste is approximately 0.3~0.4 degrees Celsius/W depending on the layer thickness. Finally the exterior perimeter's thermal resistance depends on the distance from the perimeter to the junction and is approximately 0.4 degrees C./W. Table 1 lists the associated material properties used in an exemplary thermal analysis.

TABLE 1

Thermal properties of the arrangement illustrated in FIGURE.

| Layer | Thickness Micrometers | Density Kg/m3 | Conductivity W/m k | Specific Heat J/kg K |
|---|---|---|---|---|
| Controller | 270 | 2300 | 150 | 710 |
| Solder | 80 | 1100 | 75 | 219 |
| Copper | 380 | 8300 | 400 | 385 |
| Alumina | 500 | 3700 | 28 | 850 |
| Conductive Paste | 50 | 2000 | 0.81 | 800 |
| Cooper | 380 | 8300 | 400 | 385 |

Using Equation (1) above the heat sink temperature was calculated as 77 degree Celsius for a 1754 J energy pulse for a 30 second period which was the highest. The results match within 1% of the three dimensional FEA model. Since heat generation in MOSFET switches are dictated by junction temperature, the loss loop can be determined using a simplified network model. First, a simplified steady state power loss of 414.6 W was calculated using the duty cycle of the power device. This calculated a steady state heat sink temperature. The junction temperature was then calculated as listed in Table 1 above. If the predicted junction temperature is above 150 degrees Celsius the calculations will need to be rerun for a different heat sink configuration.

The power loss in any MOSFET switch is the combination of conduction loss and switching loss. Conduction losses for the MOSFETS was calculated using the following using (piecewise) approximation formulation:

$$P_D = I_D V_D + I_D^2 R_D \quad (3)$$

Switching losses for the MOSFETS are calculated using a linearized model over sine wave $$P_{D,sw} = \frac{F_c(E_{rr})I_{pk}}{\pi I_m} \quad (4)$$

The present invention is not limited to any single motor application. Exemplary applications include motors for pumps, turbines, down hole well, flood control, agriculture and irrigation, mine slurry, aeration and mixing, below deck ships and dry pit environments, etc. The motor materials should be selected for their ability to withstand extreme environmental conditions while immersed in various environments, such as salt water, oil, and untreated sewage water.

The above description has illustrated and described only exemplary embodiments of the invention. It is to be understood that the invention can be utilized in various combinations and configurations. The invention can be changed or modified within the scope of the exemplary embodiments. The invention is only to limited by the scope of the claims which follow.

What is claimed is:

1. A method comprising:
    transferring heat through an aperture at an end of a motor, through a central opening of a first flange mounted on an exterior of the motor to air contained in an air pocket of a chamber, the chamber being defined by a wall extending from the first flange;
    transferring heat from the air contained in the air pocket through the chamber to an opposite end of the chamber;
    transferring heat from the air contained in the air pocket through a central opening of a second flange of the wall to a side of a heat sink mounted on the second flange; and transferring heat from a controller mounted on the side of the heat sink and disposed in the chamber to cooling fins disposed on an opposite side of the heat sink.

2. A method as recited in claim 1, the transferring of the heat through the air is by natural convection through the air.

3. The method of claim 1, the controller being located inside a cover mounted on the side of the heat sink.

4. The method of claim 1, the wall of the chamber having a sloped top surface for enhancing air flow over the chamber.

5. The method of claim 1 further comprising transferring heat from the heat sink to a heat pipe disposed in the heat sink between the controller and cooling fins.

6. The method of claim 1, further comprising transferring heat from the heat sink to a heat pipe disposed in the heat sink and cooling fins.

7. The method of claim 6, the heat pipe including a plurality of extensions of the heat pipe, each one of the plurality of extension disposed in one of the cooling fins.

8. The method of claim 1, further comprising circulating the air contained in the air pocket with a fan within the chamber.

9. A method, comprising: transferring heat from a motor through a central opening of a first flange mounted on an exterior of the motor to air contained in an air pocket of a chamber, the chamber being defined by a wall extending from the first flange, the wall of the chamber having a sloped top surface for enhancing air flow over the chamber;

transferring heat from the air contained in the air pocket through the chamber to an opposite end of the chamber;

transferring heat from the air contained in the air pocket through a central opening of a second flange of the wall to a side of a heat sink mounted on the second flange; and transferring heat from a controller mounted on the side of the heat sink and disposed in the chamber to cooling fins disposed on an opposite side of the heat sink.

* * * * *